(12) United States Patent
Suzuki et al.

(10) Patent No.: US 6,518,354 B1
(45) Date of Patent: Feb. 11, 2003

(54) DISPERSING EMULSION OF THERMOPLASTIC ELASTOMER AND PROCESS FOR PREPARING THE SAME

(75) Inventors: Ginpei Suzuki, Tokyo (JP); Yukihiro Okubo, Tokyo (JP); Toshiyuki Nishitani, Omihachiman (JP); Masayo Kuze, Joyo (JP)

(73) Assignees: JSR Corporation, Tokyo (JP); Dai-Ichi Kogyo Seiyaku Co., Ltd., Kyoto (JP)

( * ) Notice: Subject to any disclaimer, the term of this patent is extended or adjusted under 35 U.S.C. 154(b) by 0 days.

(21) Appl. No.: 09/623,916

(22) PCT Filed: May 25, 2000

(86) PCT No.: PCT/JP00/03342

§ 371 (c)(1),
(2), (4) Date: Sep. 11, 2000

(87) PCT Pub. No.: WO00/73382

PCT Pub. Date: Dec. 7, 2000

(30) Foreign Application Priority Data

| | | |
|---|---|---|
| May 28, 1999 | (JP) | 11-149555 |
| Jun. 14, 1999 | (JP) | 11-166886 |
| Sep. 30, 1999 | (JP) | 11-278751 |
| Sep. 30, 1999 | (JP) | 11-278752 |
| Oct. 14, 1999 | (JP) | 11-292338 |
| Oct. 14, 1999 | (JP) | 11-292339 |
| Apr. 17, 2000 | (JP) | 2000-115363 |

(51) Int. Cl.$^7$ ............... C08J 3/05; C08K 5/06; C08L 9/08; C08L 21/02; C08L 95/00
(52) U.S. Cl. ............ 524/575; 516/77; 516/920; 523/340; 524/60
(58) Field of Search ........... 516/77, 920; 524/575, 524/60; 523/340

(56) References Cited

U.S. PATENT DOCUMENTS

| | | | |
|---|---|---|---|
| 2,799,662 A | * 7/1957 | Ernst et al. | 516/77 X |
| 2,854,421 A | * 9/1958 | Wenzelberger | 524/575 X |
| 3,929,707 A | * 12/1975 | Berg et al. | 523/340 X |
| 3,989,661 A | * 11/1976 | Bondy | 516/77 X |
| 3,998,772 A | * 12/1976 | Beerbower et al. | 516/77 X |
| 4,041,712 A | * 8/1977 | Stepien, Jr. et al. | 524/575 X |
| 4,057,528 A | * 11/1977 | Hunt | 524/575 X |
| 4,592,690 A | * 6/1986 | Busch | 524/575 X |
| 4,781,781 A | * 11/1988 | Hallworth | 524/575 X |
| 5,082,591 A | * 1/1992 | Marchetto et al. | 516/920 X |
| 5,296,166 A | * 3/1994 | Leong | 516/77 |
| 5,336,712 A | * 8/1994 | Austgen, Jr. et al. | 523/340 X |
| 6,444,738 B1 | * 9/2002 | Reeves | 524/575 X |

FOREIGN PATENT DOCUMENTS

| | | | |
|---|---|---|---|
| JP | 51-80344 | 7/1976 | C08J/3/02 |
| JP | 51-80348 | 7/1976 | C08L/9/10 |
| JP | 2-292368 | 12/1990 | C08L/95/00 |
| JP | 8-120124 | 5/1996 | C08L/21/02 |

OTHER PUBLICATIONS

Patent Abstract of Japan 010786670 May 14, 1996.
Patent Abstract of Japan 008515156 Dec. 3, 1990.

* cited by examiner

*Primary Examiner*—Richard D. Lovering
(74) *Attorney, Agent, or Firm*—Sughrue Mion, PLLC

(57) ABSTRACT

There is provided a dispersing emulsion excellent in storage stability and mechanical stability, particularly an asphalt modifier of an water based dispersing emulsion, which can be mixed with a hot asphalt or an asphalt emulsion, and can improve rutting resistance, toughness, and flexibility at a low temperature without losing workability. There is provided a dispersing emulsion of a thermoplastic elastomer, which is emulsified and dispersed in the presence of at least one nonionic emulsifier selected from the group consisting of a styrenated phenol poly(alkylene oxide), a poly(alkylene polyamine) poly(alkylene oxide), polyalcohol fatty acid esters, polyalcohol fatty acid esters poly(alkylene oxide), and a benzylated phenol poly(alkylene oxide).

15 Claims, No Drawings

DISPERSING EMULSION OF THERMOPLASTIC ELASTOMER AND PROCESS FOR PREPARING THE SAME

This application is a 371 of PCT/JP 00/03342 filed May 25, 2000.

TECHNICAL FIELD

The present invention relates to a dispersing emulsion of a thermoplastic elastomer, a process for preparing the same, and an asphalt modifier imparting preferable properties to asphalt. In particular, the present invention relates to a dispersing emulsion of a thermoplastic elastomer having storage stability and mechanical stability of the dispersing emulsion improved by using a specific nonionic emulsifier as an emulsifier for emulsification and dispersion, the other emulsifiers used as an optional component and a thickener, as well as a process for preparing the same, and an asphalt modifier comprising the water-based dispersing solution.

BACKGROUND ART

There is disclosed a block copolymer latex emulsified with a block copolymer represented by the general formula:

A-B-A, (A-B)n, B-(A-B)n, (A-B)n-A or A-B-(B-A)n (wherein A is a non-elastic polymer block having a secondary transition temperature of at least 25° C., B is an elastic polymer block having a secondary transition temperature of at most 10° C., and n is an integer of at least 2), and as an emulsifier with (a) a rosin ester or a heterogeneous rosin ester and (b) a compound represented by the general formula:

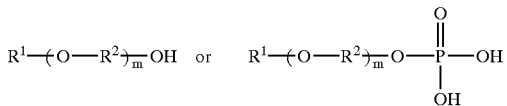

(wherein $R^1$ is an alkyl group containing 8 to 18 carbon atoms or an alkyl phenyl group having an alkyl group containing 8 to 12 carbon atoms, $R^2$ is an alkylene group containing 2 to 5 carbon atoms, and m is an integer of 3 to 50) and as an optional component with a thickener (methyl cellulose, carboxymethyl cellulose, hydroxyethyl cellulose, casein, poly(acrylic acid) or a derivative thereof (Japanese Examined Patent Publication No.52-22651/1977).

As the similar technique to the block copolymer latex, there is disclosed a copolymer latex of styrene and butadiene, wherein (a) higher fatty acid, rhodinic acid or heterogeneous rhodinic acid, and (b) a

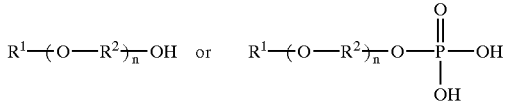

compound represented by the general formula:
(wherein $R^1$ is an alkyl group containing 8 to 18 carbon atoms or an alkyl phenyl group having an alkyl group containing 8 to 12 carbon atoms, $R^2$ is an alkylene group containing 2 to 5 carbon atoms, and n is an integer of 3 to 50) as emulsifiers are dissolved in a polymer solution comprising a random copolymer of styrene and butadiene, a binary block copolymer of styrene and butadiene or a mixture thereof obtained as a copolymer latex of styrene and butadiene by solution polymerization, and then mixed and emulsified with an aqueous alkali solution (Japanese Examined Patent Publication No.52-15100/1977 and Japanese Unexamined Patent Publication No.51-13847/1976).

However, the block copolymer latex and the copolymer latex of styrene and butadiene have the problem that storage stability or mechanical stability is not always satisfactory.

In recent years, there has been developed asphalt (modified asphalt) having viscosity at 60° C., toughness, tenacity, temperature sensitivity and the like improved by adding a modifier comprising polymer materials such as a rubber and a resin (containing a thermoplastic elastomer, hereinafter as the same) to asphalt and it has been used for improving rutting resistance, abrasion resistance and the like of road.

As the modifier, there is disclosed an asphalt modifier in the form of an aqueous dispersing emulsion with an average particle diameter of at most 5 μm (Japanese Unexamined Patent Publication No.2-292368/1990). The modifier is obtained by dissolving the thermoplastic elastomer into an organic solvent, adding an emulsifying dispersant containing a poly(alkylene oxide) group-containing anionic surfactant as a major component and a nonionic surfactant as an optional component thereto in an amount of at most 10% by weight based on the elastomer, and then adding hot water to emulsify the resulting mixture, and removing the organic solvent.

Examples of the poly(alkylene oxide) group-containing anionic surfactant and the nonionic surfactant as the optional component are poly(oxyethylene nonyl phenol ether) sodium sulfate (an adduct with 4 moles of ethylene oxide), poly(oxyethylene dodecyl ether) sodium acetate (an adduct with 3 moles of ethylene oxide) and poly(oxyethylene nonyl phenol ether) (an adduct with 4 moles of ethylene oxide).

However, the asphalt modifier, the block copolymer latex and the copolymer latex of styrene and butadiene, which can be used as the asphalt modifier, have the problem that storage stability or mechanical stability is not always satisfactory. Further, because all of them are emulsions mainly comprising an anionic surfactant, it is difficult to be mixed with a cationic asphalt emulsion as a major group of an asphalt emulsion, and it is impossible to be used for modifying a cationic asphalt emulsion.

DISCLOSURE OF INVENTION

The present invention is made to solve the problems in the prior art described above. Namely, the present invention relates to a dispersing emulsion of a thermoplastic elastomer, which is emulsified and dispersed in the presence of at least one nonionic emulsifier selected from the group consisting of a styrenated phenol poly(alkylene oxide), a poly(alkylene polyamine) poly(alkylene oxide), polyalcohol fatty acid esters, polyalcohol fatty acid esters poly(alkylene oxide) and a benzylated phenol poly(alkylene oxide).

Further, the present invention relates to a process for preparing the dispersing emulsion, which comprises preparing a solution containing at least one nonionic emulsifier selected from the group consisting of a styrenated phenol poly(alkylene oxide), a poly(alkylene polyamine) poly (alkylene oxide), polyalcohol fatty acid esters, polyalcohol fatty acid esters poly(alkylene oxide) and a benzylated phenol poly(alkylene oxide) dissolved in a solution comprising thermoplastic elastomer and an organic solvent, then emulsifying the solution by mixing with water, and distilling the organic solvent.

In addition, the present invention relates to an asphalt modifier comprising the aqueous dispersing emulsion.

BEST MODE FOR CARRYING OUT THE INVENTION

The thermoplastic elastomer used in the present invention, when used as e.g. an aqueous pressure-sensitive adhesive, is used as a component for improving a holding strength at a high temperature by mixing it with an acrylic aqueous pressure-sensitive adhesive. In addition, the thermoplastic elastomer, when added to an SBR latex for water based chipping-resistant coating, is used as a component excellent in compatibility with SBR and capable of improving chipping resistance and adhesion.

Especially, the thermoplastic elastomer is preferably the one, which is excellent in compatibility with asphalt and is capable of improving softening point, viscoelasticity, toughness, high-temperature viscosity and low-temperature flexibility of asphalt when added to asphalt.

As the thermoplastic elastomer, there is no particular limitation therefor, as long as it is conventionally used for the above-described purposes. Examples thereof are block copolymers used as hot-melt adhesive and represented by the general formula:

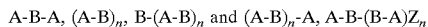

wherein A is a non-elastic polymer block having a secondary transition temperature of at least 25° C., B is an elastic polymer block having a secondary transition temperature of at most 10° C., and n is an integer of at least 2.

Examples of the non-elastic polymer block are a homopolymer block of a monomer selected from monovinyl aromatic hydrocarbons such as styrene and α-methylstyrene, a copolymer block comprising at least 2 of these monomers; a copolymer block of a monovinyl aromatic hydrocarbon and the tapered aliphatic conjugated diene compound of the following B block component; and a random copolymer block of a monovinyl aromatic hydrocarbon and the aliphatic conjugated diene compound of the following B block component. Examples of the blocks are blocks of a styrene polymer, a copolymer of styrene and α-methylstyrene, a copolymer of styrene and tapered butadiene or isoprene, and a random copolymer of styrene and butadiene or isoprene. Molecular weight thereof is generally 1,000 to 200,000, preferably 10,000 to 50,000.

Examples of the elastic polymer block are a homopolymer block of a monomer selected from aliphatic conjugated diene compounds such as butadiene and isoprene, a copolymer block comprising at least 2 of these monomers; a copolymer block of an aliphatic conjugated diene compound and a tapered monovinyl aromatic compound; a random copolymer block of an aliphatic conjugated diene compound and a monovinyl aromatic compound; and a polymer block of hydrogenating these polymer blocks. Examples of these blocks are block of a butadiene polymer, an isoprene polymer, a copolymer of butadiene and isoprene, a copolymer of styrene and tapered butadiene or isoprene, a random copolymer of styrene and butadiene or isoprene, a hydrogenated copolymer of butadiene, and a hydrogenated copolymer of styrene and butadiene. Molecular weight thereof is generally 5,000 to 500,000, preferably 100,000 to 350,000.

A content of the non-elastic polymer block in the block copolymer is preferably 10 to 70% by weight, more preferably 20 to 40% by weight based on the whole polymer. If the content is over or below the range, properties as the thermoplastic elastomer are hardly exhibited.

A molecular weight of the block copolymer is preferably 10,000 to 700,000, more preferably 100,000 to 500,000. If the molecular weight is too low, mechanical strength of a film obtained from the emulsion tends to be insufficient. If it is too high, viscosity upon emulsification tends to be too high, emulsification becomes incomplete or difficult and it adversely affects on performance of the obtained emulsion.

Examples of the block copolymer are a block copolymer of SBS, a block copolymer of SIS and a hydrogenated block copolymer of SBS, and the like. These may be used solely or in a combination use of two or more thereof.

These block copolymers can be obtained by a method of polymerizing each monomer block one after another in the presence of a living polymerization initiator, a method of simultaneously introducing at least two monomers having different reactivity and polymerizing them to obtain a block copolymer, and a method of coupling the living block copolymers.

As the polymer solution for preparing the block copolymer emulsion from the block copolymer, the polymerization solution may be used as such. Further, the block copolymer in a solid form may be used by dissolving them in a solvent such as benzene, toluene, xylene, cyclohexane, cyclooctane, chloroform, carbon tetrachloride, trichlene or methane dichloride. Preferably, the polymer solution is used at a concentration of usually 5 to 30% by weight.

For emulsification and dispersion of the thermoplastic elastomer in the present invention, there can be used at least one selected from the group consisting of a styrenated phenol poly(alkylene oxide), a poly(alkylene polyamine) poly(alkylene oxide), polyalcohol fatty acid esters, polyalcohol fatty acid esters poly(alkylene oxide) and a benzylated phenol poly(alkylene oxide). If necessary, there can be used at least one selected from the group of consisting of a nonionic emulsifier, an anionic emulsifier and a cationic emulsifier other than the above emulsifiers is used, provided that anionic and cationic emulsifiers are not usually contained simultaneously. Because the specified emulsifiers are used for emulsification and dispersion of the thermoplastic elastomer, the dispersing emulsion of a thermoplastic elastomer thus produced can be excellent in storage stability and mechanical stability. Further, the organic solvent can be easily removed in a short time and stability of an aqueous emulsion during storage can be prepared by controlling foaming at low-pressure removal of the organic solvent (for example toluene, xylene, benzene, cyclohexane, cyclooctane and the like) used for emulsification and dispersion of the thermoplastic elastomer in production of the thermoplastic elastomer emulsion. In addition, when nonionic emulsifiers other than the specified emulsifiers are used, the thermoplastic elastomer emulsion can be used for modifying not only nonionic but also anionic or cationic aqueous coating and aqueous adhesive, because the specified emulsifiers are also nonionic. The emulsion can be mixed with a cationic asphalt emulsion as a major application of the asphalt emulsion, and can be used for modifying the cationic asphalt emulsion. If an anionic emulsifier is used as the emulsifier, the emulsion is preferable from the viewpoint of an absence of ion shock generated at mixing with generally anionic emulsions such as synthetic rubber latex, vinyl acetate emulsion, acrylic emulsion and vinyl chloride emulsion. If a cationic emulsifier is used as the emulsifier, the emulsion is preferable from the viewpoint that a decomposition rate thereof at applying it to inorganic materials such as cement mortar and building stone becomes high. And the emulsion can be mixed with a cationic asphalt emulsion as a major application of an asphalt emulsion, it can be used for modifying the cationic asphalt emulsion.

The above-mentioned styrenated phenol poly(alkylene oxide) is obtained by addition-polymerizing $C_{2-4}$ alkylene oxide (for example ethylene oxide, propylene oxide and butylene oxide) with at least one selected from the group consisting of monostyrenated phenol, distyrenated phenol and tri or more styrenated phenol. For example, the distyrenated phenol poly(ethylene oxide) is shown in the following formula:

The tri or more styrenated phenol is the tristyrenated phenol,

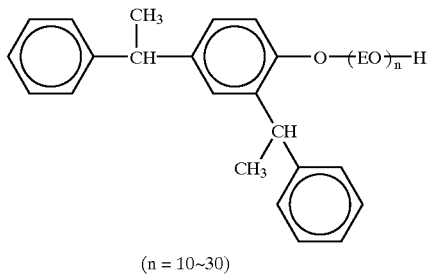

(n = 10~30)

which may contain tetra-styrenated or more styrenated phenol in a small amount thereof.

Preferable examples of the styrenated phenol poly(alkylene oxide) are a monostyrenated phenol poly(alkylene oxide) having an average addition molar ratio of ethylene oxide of 20 moles, a distyrenated phenol poly(alkylene oxide), and a tristyrenated or more styrenated phenol poly(alkylene oxide) in a proportion of 10 to 20:40 to 55:30 to 45 assuming that the total amount is 100 (weight ratio), and the like.

The monostyrenated phenol poly(alkylene oxide), the distyrenated phenol poly(alkylene oxide), and the tristyrenated or more styrenated phenol poly(oxyalkylene oxide) may be used solely as the styrenated phenol poly(alkylene oxide). But a mixture thereof is preferably used because higher emulsifiability is achieved with a broader distribution thereof.

The above-mentioned polyalkylene polyamine poly(alkylene oxide) is obtained by addition polymerizing $C_{2-4}$ alkylene oxide with polyalkylene polyamines such as polyethylene imine, tetraethylene pentamine, pentaethylene hexamine and hexaethylene heptamine (for example, a polymer obtained by random or block addition polymerizing ethylene oxide and propylene oxide or butylene oxide).

Preferable examples of the polyalkylene polyamine poly(alkylene oxide) are multifunctional nitrogenous polyether compounds obtained by random or block adding ethylene oxide and propylene oxide with polyethylene imine (for example having a molecular weight of 1200 or 1800).

The above-mentioned polyalcohol fatty acid esters comprise e.g. a polyalcohol (trivalent to octavalent) and a saturated or unsaturated fatty acid containing 8 to 22 carbon atoms. Examples thereof are esters having an average hydroxyl group of 2 to 3 in one molecule in case of sorbitan, and esters having an average hydroxyl group of 5 to 7 hydroxyl groups in one molecule in case of sucrose.

Examples of the polyalcohol are glycerin, diglycerin, sorbitol and sorbide (phonetic), as well as the above-mentioned sorbitan and sucrose.

Examples of the saturated or unsaturated fatty acid are saturated fatty acids such as lauric acid, palmitic acid, stearic acid, behenic acid, synthetic straight or branched saturated fatty acids containing 8 to 22 carbon atoms, and unsaturated fatty acids such as oleic acid, linolic acid and linolenic acid.

Preferable examples of the polyalcohol fatty ester are sorbitan oleate (including mono-, di-, tri- and tetra-esters and containing 2 to 3 hydroxyl groups in one molecule), and the like.

The polyalcohol fatty acid esters poly(alkylene oxide) comprises, for example, a polyalcohol (trivalent to octavalent) and a saturated or unsaturated fatty acid containing 8 to 22 carbon atoms. Example thereof are the esters obtained by addition polymerizing alkylene oxide containing 2 to 4 carbon atoms (for example, ethylene oxide, propylene oxide or butylene oxide) with a polyvalcohol fatty acid ester having 2 to 3 hydroxyl groups in one molecule in case of sorbitan or with a polyalcohol fatty acid ester having 5 to 7 hydroxyl groups in one molecule in case of sucrose.

As the polyalcohol and the saturated or unsaturated fatty acid, those used in preparation of the polyalcohol fatty ester can be used.

Preferable examples of the polyalcohol fatty acid ester poly(alkylene oxide) are Tween 60, Tween 80 and Tween 85 (available from Atlas Co., Ltd.) and Sorgen TW-20, Sorgen TW-60 and Sorgen TW-80 (available from Dai-ichi Kogyo Seiyaku Co., Ltd.).

The above-mentioned benzylated phenol poly(alkylene oxide) is obtained by addition polymerizing $C_{2-4}$ alkylene oxide (for example, ethylene oxide, propylene oxide or butylene oxide) with at least one selected from the group consisting of monobenzylated phenol, dibenzylated phenol, and tribenzylated or more benzylated phenol. For example, dibenzylated phenol poly(ethylene oxide) is shown in the following formula:

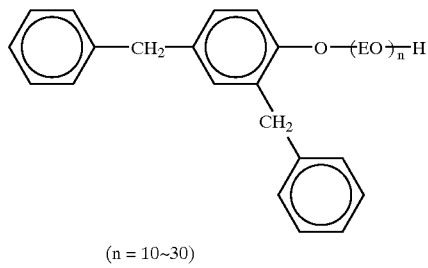

(n = 10~30)

The tribenzylated or more benzylated phenol means the tribenzylated phenol, which may contain tetrabenzylated or more benzylated phenol in a small amount thereof.

Preferable examples of the benzylated phenol poly(alkylene oxide) are a polymer comprising a monobenzylated phenol and ethylene oxide having an average addition molar ratio of ethylene oxide of 20 moles, a polymer comprising dibenzylated phenol and ethylene oxide, and a polymer comprising tribenzylated or more benzylated phenol and ethylene oxide in a proportion of 10 to 20:40 to 55:30 to 45 assuming that the total amount is 100 (weight ratio), and the like.

The monobenzylated phenol poly(alkylene oxide), the dibenzylated phenol poly(alkylene oxide) and the tribenzylated or more benzylated phenol poly(alkylene oxide) may be used solely as the benzylated phenol poly(alkylene oxide). Because higher emulsifiability is achieved with a broader distribution of the adducts, a mixture thereof is preferably used.

The above-mentioned emulsifiers may be used solely or in a combination use of two or more thereof. Among those, the styrenated phenol poly(alkylene oxide) and the benzylated phenol poly(alkylene oxide) are preferable from the viewpoint of high polydispersion (due to a broad distribution of both hydrophobic and hydrophilic groups), high polydispersion of emulsified thermoplastic elastomer, and excellent emulsion performance to minimize foam troubles.

The above-mentioned emulsifiers may be used only as the nonionic emulsifier as described above, but may also be used in a combination use of at least one selected from an conventional nonionic emulsifier (a nonionic emulsifier other than the specified emulsifiers), an anionic emulsifier and a cationic emulsifier, which can be used for preparation of the dispersing emulsion of the thermoplastic elastomer. However, unless there is a particular reason, the anionic emulsifier and the cationic emulsifier can not be contained simultaneously.

Examples of the conventional nonionic emulsifier are alkyl polyoxyethylene ether (the number of carbon atom in the alkyl group is 8 to 22), alkylphenol polyoxyethylene ether (the number of carbon atom in the alkyl group is 8 to 12), alkyl polyoxyethylene polyoxypropylene ether (the number of carbon atom in the alkyl group is 8 to 22, and either the polyoxyethylene block or the polyoxypropylene block may firstly be added, or these blocks may be added at random), fatty acid polyoxyethylene ester (fatty acid is a saturated or unsaturated fatty acid containing 8 to 22 carbon atoms), polyoxyethylene (cured) castor oil, alkyl polyoxyethylene amine (the number of carbon atom in the alkyl group is 8 to 18), alkyl polyoxyethylene amide (the number of carbon atom in the alkyl group is 8 to 18), and the like. These may be used solely or in a combination use of two or more thereof.

Examples of the conventional nonionic emulsifier are a nonylphenol ethylene oxide, a higher alcohol ethylene oxide, a higher fatty acid ethylene oxide, a block copolymer of polyoxyethylene and polyoxypropylene, a higher aliphatic amine and ethylene oxide, a higher aliphatic amide ethylene oxide, and the like.

Examples of the anionic emulsifier are a carboxylic acid-type anionic emulsifier, a sulfate-type anionic emulsifier, a sulfonic acid-type anionic emulsifier and a phosphate-type anionic emulsifier. These may be used solely or in a combination use of two or more thereof.

Examples of the carboxylic acid-type anionic emulsifier are a fatty acid salt represented by the general formula:

RCOOM (wherein R is a saturated or unsaturated hydrocarbon group containing $C_{7-21}$, M is a cation such as Na, K, $NH_4$ or alkanolamine-H), a rosin ester salt which is a salt resinate obtained by extraction of a pine tree and contains an abietate salt as a major component (represented by e.g.),

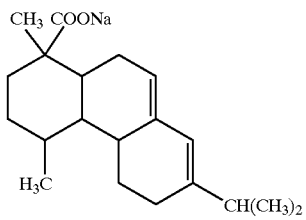

a naphthenate represented by the general formula:

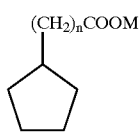

(wherein M is a cation such as Na, K or alkanolamine.H, and n is at least 1) which is a salt of an carboxylic acid contained in petroleum, an ether carboxylate salt represented by the general formula:

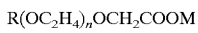

$R(OC_2H_4)_nOCH_2COOM$ (wherein R is a $C_{10-18}$ alkyl group or an alkyl phenyl group, M is a cation such as Na or K, and n is at least 2), alkenyl succinate salt represented by the general formula:

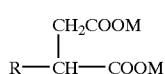

(wherein R is a $C_{8-18}$ unsaturated hydrocarbon group, and M is a cation such as Na), N-acyl sarcosine salt represented by the general formula:

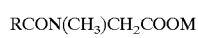

$RCON(CH_3)CH_2COOM$ (wherein R is a $C_{11-18}$ saturated or unsaturated hydrocarbon group, and M is a cation such as Na), N-acyl glutamate represented by the general formula:

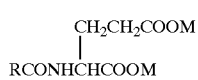

(wherein R is a $C_{11-18}$ saturated or unsaturated hydrocarbon group, and M is a cation such as Na or alkanolamine.H), and the like. These may be used solely or in a combination use of two or more thereof. Among those, a rosin ester salt (rosined soap) is preferable from the viewpoint that foaming during solvent removal (usually toluene removal) is small and stability of the emulsion becomes excellent.

Examples of the sulfate-type anionic emulsifiers are a sulfate primary alkyl salt represented by the general formula:

$ROSO_3M$ (wherein R is a $C_{8-18}$ saturated or unsaturated hydrocarbon group, and M is a cation such as Na, K, $NH_4$ or alkanolamine.H), a sulfate secondary alkyl salt represented by the general formula: (wherein $RR^1CH—$ is a group in which OH group is removed from a

secondary alcohol having a $C_{12-16}$ straight or branched alkyl group, and M is a cation such as Na), a sulfate alkyl polyoxyethylene salt represented by the general formula:

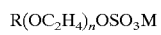

(wherein R is a $C_{12-18}$ saturated or unsaturated hydrocarbon group, M is a cation such as Na, K, $NH_4$ or alkanolamine.H, and n is at least 2), a sulfate alkyl phenyl polyoxyethylene salt represented by the general formula:

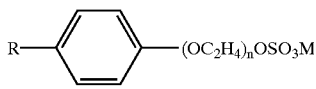

(wherein R is a $C_{8-12}$ alkyl group, M is a cation such as Na, and n is at least 2),
a sulfate monoacyl glycerin salt represented by the general formula:

$$RCOOCH_2CH(OH)CH_2OSO_3M$$

(wherein R is a $C_{11-17}$ saturated or unsaturated hydrocarbon group, and M is a cation such as Na),
an acyl amino sulfate represented by the general formula:

$$RCONHC_2H_4OSO_3M$$

(wherein R is a $C_{11-17}$ saturated or unsaturated hydrocarbon group, and M is a cation such as Na),
a sulfated oil wherein double bonds and hydroxyl groups in fats and oils such as olive oil, castor oil, cotton seed oil, rape seed oil and tallow are salts of sulfated products (acyl glycerin is also partially hydrolyzed and sulfated),
sulfated fatty alkyl esters which are salts of sulfated products such as propyl and butyl esters of fatty acids having double bonds and hydroxyl groups such as oleic acid and ricinoleic acid, and the like. These may be used solely or in a combination use of two or more thereof.

Examples of the sulfonic acid-type anionic emulsifier are α-olefin sulfonate salt (AOS) obtained as a mixture of a $C_{14-19}$ α-olefin sulfonate which are generally $RCH=CHCH_2SO_3M$ (alkenyl derivative) and

(wherein M is a cation such as Na and K), a secondary alkane sulfonate salt obtained by alkali neutralization of $SO_2$ and $Cl_2$ sulfoxylated products or sulfochlorinated products with $C_{8-20}$ n-paraffin, α-sulfonated salts such as methyl and isopropyl esters of $C_{12-18}$ fatty acids, α-sulfo-fatty ester salts, an acylisethionate salt represented by the general formula:

$$RCOOC_2H_4SO_3M$$

(wherein R is a $C_{11-17}$ saturated or unsaturated hydrocarbon group, and M is a cation such as Na), N-acyl-N-methyl taurine acid salt represented by the general formula:

$$RCON(CH_3)C_2H_4SO_3M$$

(wherein R is a $C_{11-17}$ saturated or unsaturated hydrocarbon group, and M is a cation such as Na), a dialkyl sulfosuccinic acid salt represented by the general formula:

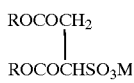

(wherein R is a $C_{2-20}$ straight-chain or branched alkyl group, and M is a cation such as Na), an alkyl benzene sulfonate salt (ABS, LAS) represented by the general formula:

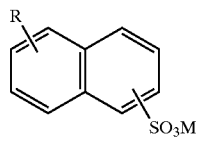

(wherein $RR^1CH$— is a $C_{9-13}$ straight or branched alkyl group, and M is a cation such as Na or K), an alkyl naphthalene sulfonate salt represented by the general formula:

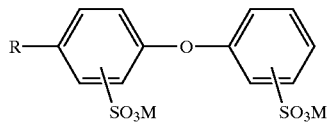

(wherein R is a $C_{3-5}$ straight or branched allyl group, and M is a cation such as Na), an alkyl diphenyl ether disulfonate salt represented by the general formula:

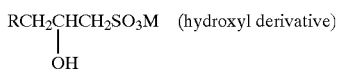

(wherein R is a $C_{12}$ alkyl group, and M is a cation such as Na), a petroleum sulfonate salt, a lignin sulfonate salt and the like. These may be used solely or in a combination use of two or more thereof.

Examples of the phosphate-type anionic emulsifier are an alkyl phosphate salt (present as (1) monophosphate salt, (2) diphosphate salt, or (3) a mixture of (1) and (2)) represented by the general formula:

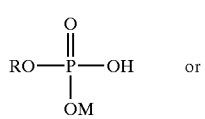 (1)

or

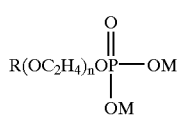 (2)

(wherein R is a $C_{8-18}$ alkyl group, and M is a cation such as H, Na, K, $NH_4$ or alkanolamine.H), an alkyl phosphate polyoxyethylene salt (usually present as a mixture with diester salts) represented by the general formula:

$$R(OC_2H_4)_nO\overset{O}{\underset{OM}{\overset{\|}{P}}}\!-\!OM$$

(wherein R is a $C_{12-18}$ alkyl group, M is a cation such as H, Na, K or alkanolamine.H, and n is at least 2) and an alkyl phosphate phenyl polyoxyethylene salt (usually present as a mixture of a monoester salt and a diester salt) represented by the general formula:

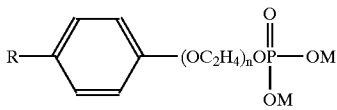

(wherein R is a $C_{8-12}$ alkyl group, M is a cation such as H, Na, K or alkanolamine.H, and n is at least 2). These may be used solely or in a combination use of two or more thereof.

Examples of the cationic emulsifier are an alkyl amine salt-type cationic emulsifier, an acyl amine salt-type cationic emulsifier, a quaternary ammonium salt-type cationic emulsifier, amide bond-containing ammonium salt-type cationic emulsifier, ester bond- or ether bond-containing ammonium salt-type cationic emulsifier, imidazoline or imidazolium salt-type cationic emulsifier and amine derivative-type cationic emulsifier, and the like. These may be used solely or in a combination use of two or more thereof.

Examples of the alkyl amine salt-type cationic emulsifier and the acyl amine salt-type cationic emulsifier are a primary amine salt having $C_{12-18}$ alkyl group (hydrochloride salt, acetate salt etc.), an acyl aminoethyl diethyl amine salt having $C_{17}$ alkyl group or alkenyl group (hydrochloride salt, formate salt, acetate salt, lactate salt etc.), N-alkyl polyalkylene polyamine salt having $C_{12-18}$ alkyl group (hydrochloride salt or acetate salt, the number of carbon atom in the alkylene group is 2 to 3, and the number of repeating alkylene amine groups is 1 to 3), a fatty acid polyethylene polyamide salt having $C_{17}$ alkyl group or alkenyl group (hydrochloride salt, the number of repeating ethylene amine group is 2), a diethyl aminoethyl amide salt having $C_{17}$ alkyl group (hydrochloride salt, acetate salt, lactate salt etc.). These may be used solely or in a combination use of two or more thereof.

Examples of the quaternary ammonium salt-type cationic emulsifier and amide bond-containing ammonium salt-type cationic emulsifier are an alkyl or alkenyl trimethyl ammonium salt (anion is $Cl^-$, $Br^-$, $CH_3SO_4^-$ or the like) having $C_{12-18}$ alkyl group or $C_{18}$ alkenyl group, a dialkyl or dialkenyl dimethyl ammonium salt (anion is $Cl^-$, $Br^-$, $CH_3SO_4^-$) having $C_{12-18}$ alkyl group or $C_{18}$ alkenyl group, an alkyl or alkenyl dimethyl benzyl ammonium salt (anion is $Cl^-$) having $C_{12-18}$ alkyl group or $C_{18}$ alkenyl group, an alkyl pyridium salt (anion is $Cl^-$ or $Br^-$) having $C_{12-18}$ alkyl group, an acyl aminoethyl methyl diethyl ammonium salt (anion is $CH_3SO_4^-$) having $C_{17}$ alkyl group or $C_{17}$ alkenyl group, an acyl aminopropyl dimethyl benzyl ammonium salt (anion is $Cl^-$) having $C_{13}$ alkyl group, an acyl aminopropyl dimethyl hydroxyethyl ammonium salt (anion is $ClO_4^-$) having $C_{17}$ alkyl group, an acyl aminoethyl pyridium salt (anion is $Cl^-$) having $C_{11}$ alkyl group, a diacyl aminoethyl dimethyl ammonium salt. (anion is $Cl^-$, and one of methyl groups may be a hydroxyethyl group) having $C_{17}$ alkyl group or $C_{17}$ alkenyl group, and the like. These may be used solely or in a combination use of two or more thereof.

Examples of the ester bond or ether bond-containing ammonium salt-type cationic emulsifier are a diacyloxyethyl methyl hydroxyethyl ammonium salt (anion is $CH_3SO_4^-$) having $C_{17}$ alkyl or $C_{17}$ alkenyl group, an alkyloxymethyl pyridium salt (anion is $Cl^-$) having $C_{16}$ alkyl group. These may be used solely or in a combination use of two or more thereof.

Examples of the imidazoline or imidazolium salt-type cationic emulsifier are an alkyl or alkenyl imidazoline (in the form of an acetate salt, a carbonate salt or a quaternary product) having $C_{11-17}$ alkyl group or $C_{17}$ alkenyl group, 1-hydroxyethyl-2-alkyl or alkenyl imidazoline (a quaternary product) having $C_{11-17}$ alkyl group or $C_{17}$ alkenyl group, 1-acylaminoethyl-2-alkyl imidazolium salt (anion is $CH_3SO_4^-$, $C_2H_5SO_4^-$, and the alkyl group at the 2-position is methyl group or ethyl group) having $C_{17}$ alkyl group or alkenyl group, and the like. These may be used solely or in a combination use of two or more thereof.

Examples of the amine derivative-type anionic emulsifier are an alkyl or alkenyl polyoxyethylene amine having $C_{12-18}$ alkyl group or $C_{18}$ alkenyl group, an N-alkyl or alkenyl aminopropyl amine having $C_{12-18}$ alkyl group or $C_{18}$ alkenyl group, an N-alkyl or alkenyl polyethylene polyamine having $C_{12-18}$ alkyl group or $C_{18}$ alkenyl group, an N-acylpolyethylene polyamine having $C_{7-17}$ alkyl group or $C_{17}$ alkenyl group, fatty acid triethanolamine ester having $C_{17}$ alkyl group or $C_{17}$ alkenyl group, and the like. These may be used solely or in a combination use of two or more thereof.

Examples of alcohols used as a starting material in the preparation of the conventional nonionic emulsifier, anionic emulsifier and cationic emulsifier are; synthetic primary alcohols such as 2-ethyl hexanol, n-octanol, decanol, dodecanol, tetradecanol, hexadecanol, octadecanol, Alfol and Dobanol; synthetic secondary alcohols such as Tergitol S, Softanol and oxoalcohol; benzyl alcohol; phenols including $C_{8-22}$ such as octyl phenol, nonyl phenol and dodecyl phenol, examples of amines used as the starting material are higher amines such as lauryl amine, lauryl methyl amine and dioleyl amine, examples of carboxylic acids used as the starting materials are lauric acid, myristic acid, palmitic acid, oleic acid, stearic acid, behenic acid, rhodinic acid and the like.

If the above-mentioned emulsifiers are used in a combination use of the conventional nonionic emulsifier, an amount thereof can be suitably determined for use. From the viewpoint of emulsification of a mixture comprising thermoplastic elastomer and a solvent in preparation of an aqueous thermoplastic elastomer emulsion, prevention of foaming in the step of solvent distilling, and storage stability of the dispersing emulsion (thermoplastic elastomer emulsion), it is preferable to use the specified emulsifiers in an amount of 10 to 80 parts by weight, preferably 30 to 70 parts by weight based on 100 parts by weight of the amount of the total emulsifiers. If the specified emulsifiers are used in a combination of the conventional nonionic emulsifier, it is useful since the rate of decomposition of the emulsion for use in a combination of cement is lowered so that the long workability can be obtained.

If the above-mentioned emulsifiers and the anionic emulsifiers are used in a combination, an amount thereof can be suitably determined depending on the object. From the viewpoint of emulsification of a mixture comprising a thermoplastic elastomer and a solvent in preparation of an aqueous thermoplastic elastomer emulsion, prevention of foaming in the step of solvent distilling, and storage stability of the aqueous dispersing emulsion (aqueous thermoplastic elastomer emulsion), it is preferable to use the specified emulsifiers in an amount of 45 to 80 parts by weight, preferably 50 to 75 parts by weight, most preferably 55 to 70 parts by weight based on 100 parts by weight of the amount of the total emulsifiers. If the amount is less than 50 parts by weight, there is the tendency that the effect of preventing foaming by using the specified emulsifiers cannot be sufficiently achieved in the step of solvent distilling. On the other hand, if it is more than 80 parts by weight, it tends to be difficult to improve emulsification of a mixture comprising a thermoplastic elastomer and a solvent in preparation of an aqueous thermoplastic elastomer emulsion by using the anionic emulsifiers.

If the specified emulsifiers are used in a combination of the conventional nonionic emulsifiers and anionic emulsifiers, they are used preferably in an amount that the total amount of the specified emulsifiers and the conventional nonionic emulsifiers becomes the amount of the specified emulsifiers used in a combination of the anionic emulsifiers, and the amount of the specified emulsifiers is not lower than the lower limit.

If the specified emulsifiers and the cationic emulsifiers are used in a combination, an amount thereof can also be suitably determined depending on the object. From the viewpoint of emulsification of a mixture comprising a thermoplastic elastomer and a solvent in preparation of an aqueous thermoplastic elastomer emulsion, prevention of foaming in the step of solvent distilling, and storage stability of the dispersing emulsion (thermoplastic elastomer emulsion), it is preferable to use the specified emulsifiers in an amount of 10 to 90 parts by weight, preferably 30 to 70 parts by weight, more preferably 40 to 60 parts by weight based on 100 parts by weight of the amount of the total emulsifiers. If the amount is less than 10 parts by weight, there is the tendency that the effect of preventing foaming by using the specified emulsifiers cannot be sufficiently obtained in the step of solvent distilling. On the other hand, if it is more than 90 parts by weight, it tends to be difficult to obtain the effect of the cationic emulsifiers in improving the stability of the emulsion.

If the specified emulsifiers is used in a combination of the conventional nonionic emulsifiers and cationic emulsifiers, they are used preferably in such an amount that the total amount of the specified emulsifiers and the conventional nonionic emulsifiers becomes the amount of the specified emulsifiers used in combination of the cationic emulsifiers, and the amount of the specified emulsifiers is not lower than the lower limit.

The dispersing emulsion of the present invention is prepared by emulsifying and dispersing the thermoplastic elastomer in the presence of the specified emulsifiers and as an optional component the conventional nonionic emulsifiers, the anionic emulsifiers and the cationic emulsifiers, to form an aqueous dispersing emulsion.

An amount of the specified emulsifiers is preferably 5 to 15 parts by weight, more preferably 7 to 11 parts by weight based on 100 parts by weight of the thermoplastic elastomer. If the anionic emulsifiers are not used in a combination, the amount is preferably 9 to 11 parts by weight, whereas if the anionic emulsifiers are used in a combination, the amount is preferably 7 to 9 parts by weight. If the amount is too low, the emulsification of the mixture comprising the thermoplastic elastomer and the solvent in preparation of the dispersing emulsion (thermoplastic elastomer emulsion) becomes insufficient. On the other hand, if it is too high, the trouble of foaming tends to occur in the step of solvent distilling, and time required for distilling solvent is significantly prolonged. If the emulsion is added as an asphalt modifier to asphalt, the asphalt properties tend to be lowered.

When the nonionic emulsifiers are used as the optional emulsifiers, an amount of the total emulsifiers is preferably 5 to 15 parts by weight, more preferably 9 to 11 parts by weight based on 100 parts by weight of the thermoplastic elastomer. When the anionic emulsifiers are used as the optional emulsifiers, an amount of the total emulsifiers is preferably 5 to 10 parts by weight, more preferably 7 to 9 parts by weight based on 100 parts by weight of the thermoplastic elastomer. When the cationic emulsifiers are used as the optional emulsifiers, an amount of the total emulsifiers is preferably 5 to 15 parts by weight, more preferably 9 to 11 parts by weight based on 100 parts by weight of the thermoplastic elastomer. If the anionic or cationic emulsifiers are used, the conventional nonionic emulsifiers may in the above range.

From the viewpoint of storage stability of the dispersing emulsion (thermoplastic elastomer emulsion) or that viscosity thereof sufficient for easily transferring by a pump, an amount of the thermoplastic elastomer, the specified emulsifiers and the like in the dispersing emulsion (thermoplastic elastomer emulsion) is preferably 40 to 65% by weight, more preferably 45 to 60% by weight.

The dispersing emulsion (thermoplastic elastomer emulsion) can be prepared, for example, by a method of mixing a solution of the thermoplastic elastomer in an organic solvent, a dissolved mixture of the specified emulsifiers etc., and hot water in a line mixer, or by a method of mixing a solution of the thermoplastic elastomer in an organic solvent, a dissolved mixture of the specified emulsifiers etc. and hot water by an emulsification machine, to emulsify and disperse them, and thereby removing the organic solvent at e.g. 60° C. and 720 to 640 mmHg (96.0 to 85.3 MPa).

When the organic solvent is removed, a conventional dispersing emulsion is significantly foamed so that removal of the solvent requires long time. But the specified emulsifiers are used in the present invention so that foaming can be lowered and the dispersing emulsion (thermoplastic elastomer emulsion) can be easily prepared.

Although a diameter of particles contained in the dispersing emulsion (thermoplastic elastomer emulsion) is varied depending on the method of emulsification, an amount of the emulsifiers and a concentration of the dispersing emulsion (thermoplastic elastomer emulsion), it is usually at most 5 $\mu$m, preferably 0.6 to 3 $\mu$m, more preferably 0.8 to 2 $\mu$m. If the particle diameter is too large, stability is not sufficient, whereas if it is too small, it is difficult to prepare the dispersing emulsion, its viscosity becomes high, and a problem on pump transferring tends to easily occur.

The dispersing emulsion of the present invention thus prepared is excellent in storage stability and mechanical stability, because the specified emulsifiers are excellent in emulsifiability and colloid protectability. In addition, foaming is small in preparation of the dispersing emulsion, for example, softening point, viscoelasticity, toughness, high-temperature viscosity and low-temperature flexibility of the asphalt can be improved by adding to asphalt. When the emulsion is used as an aqueous pressure-sensitive adhesive, a holding strength at a high temperature can be improved by mixing it with an acrylic aqueous pressure-sensitive adhesive. When the emulsion is added to SBR latex for an water based chipping-resistant coating, compatibility with SBR becomes excellent and chipping resistance, adhesion and the like can be improved.

At preparing the dispersing emulsion of the present invention, a thickener may be further added. If a thickener is added, the dispersing emulsion containing the thickener can be obtained, which is excellent in storage stability so that the thermoplastic elastomer is hardly separated from water even during long-term storage.

Examples of the thickener are bentonite, aluminosilicate, nonionic cellulose derivatives such as hydroxyethyl cellulose (HEC), methyl cellulose (MC), ethyl cellulose, hydroxypropyl methyl cellulose, hydroxyethyl methyl cellulose, hydroxypropyl ethyl cellulose and hydroxyethyl ethyl cellulose, anionic cellulose derivatives such as sodium carboxymethyl cellulose (CMC), cationic polymers such as dimethyl aminoethyl methacrylate methyl chloride quaternary salt polymers (e.g., Hi-Set C-200 available from Dai-ichi Kogyo Seiyaku Co., Ltd.), diallyl dimethyl ammonium chloride quaternary salt polymers, xanthan gum, rumzan gum and the like. These may be used solely or in a combination use of two or more thereof. Particularly preferable among these examples are hydroxyalkyl alkyl cellulose such as hydroxypropyl methyl cellulose and hydroxyethyl methyl cellulose, among the nonionic cellulose derivatives, an anionic cellulose derivative carboxymethyl cellulose, dimethyl aminoethyl methacrylate methyl chloride quaternary salt polymers (e.g., Hi-Set C-200, Dai-ichi Kogyo Seiyaku Co., Ltd.) among the cationic polymers, quaternary ammonium salt-type cationic polymers such as diallyl dimethyl ammonium chloride quaternary salt polymers, and xanthan gum and rumzan gum.

The xanthan gum is a natural high-molecular polysaccharide obtained by culturing a microorganism (Xanthomonas Campestris). A generally commercially available product, for example xanthan gum available from Kelco Co., Ltd., can be used without any particular limitation. An aqueous solution of xanthan gum is characterized that it shows pseudoplastic flow properties (with a higher apparent viscosity at a lower shear rate but a lower apparent viscosity at a higher shear rate), is dissolved both in cold water and in hot water to produce stable hydrophilic colloids, shows a high viscosity even at a low concentration, is stable without changing the physical properties thereof against hydrochloric acid, heat, freezing and thawing, and is excellent in transparency of an aqueous solution.

The rumzan gum is a natural high-molecular polysaccharide prepared by fermentation of a microorganism (Alcaligenes). A generally commercially available product, for example, xanthan gum from Kelco Co., Ltd., can be used without any particular limitation. An aqueous solution of rumzan gum is characterized that it shows pseudoplastic flow properties, is dissolved both in cold water and hot water to produce a viscous solution at a low concentration, is significantly superior in dispersion and emulsion stability at a low concentration, solution viscosity thereof is hardly affected by temperature, is excellent in compatibility with salts, has a stable viscosity in a wide pH range, and can be used in a combination with cellulose ethers such as CMC and MC by virtue of absence of cellulase enzyme.

When the thickener is used, the anionic thickener and the cationic polymer are usually not used in a combination, as in the case of the emulsifiers. Even in a combination of the emulsifiers, anionic and cationic ones are usually not used in a combination.

If the above thickener is added, an amount is 0.1 to 3 parts by weight, preferably 0.1 to 2 parts by weight, more preferably 0.4 to 1.8 parts by weight, more preferably 0.5 to 2 parts by weight, more preferably 0.6 to 1 part by weight based on 100 parts by weight of the thermoplastic elastomer. From the viewpoint of storage stability of the dispersing emulsion and viscosity thereof sufficient for easily transferring by a pump, an amount of the nonionic cellulose derivative used as the thickener is preferably 0.1 to 2 parts by weight, more preferably 0.4 to 1 part by weight, an amount of the anionic cellulose derivative used as the thickener is preferably 0.2 to 3 parts by weight, more preferably 0.5 to 2 parts by weight, an amount of the cationic polymer used as the thickener is preferably 1 to 3 parts by weight, more preferably 1.4 to 2.5 parts by weight, most preferably 1.4 to 1.8 parts by weight, and an amount of xanthan gum and/or rumzan gum used as the thickener is preferably 0.1 to 3 parts by weight, more preferably 0.1 to 2 parts by weight. If the amount is too small, the storage stability of the dispersing emulsion is not sufficiently improved, while if it is too large, the viscosity of the dispersing emulsion becomes too high, and it tends to be difficult to transfer it by a pump. In addition, when it is added as an asphalt modifier to asphalt, properties of the modified asphalt tend to be lowered.

When xanthan gum and/or rumzan gum is used as the thickener in a combination of another thickener, an amount of the other thickener is preferably at most 50 parts by weight, more preferably at most 40 parts by weight based on 100 parts by weight of the total thickeners, from the viewpoint of storage stability of the dispersing emulsion and viscosity thereof at transferring by a pump. When another thickener is used, xanthan gum and/or rumzan gum is preferably contained in an amount of at least 0.1 part by weight based on 100 parts by weight of the thermoplastic elastomer.

A solid content in the dispersing emulsion of the present invention described above is generally 40 to 65% by weight, more preferably 45 to 60% by weight, and viscosity thereof (as determined at 25° C. by using a Brookfield type viscometer) is 100 to 700 mPa·s, preferably 150 to 500 mPa·s. By adding the thickener, the solid content becomes generally 40 to 65% by weight, preferably 45 to 60% by weight, and the viscosity thereof (as determined at 25° C. by a Brookfield type viscometer) becomes 200 to 6000 mPa·s, preferably 350 to 4000 mPa·s.

If necessary, to the dispersing emulsion of the present invention may be added antioxidants, ultraviolet absorbers, antiseptics, defoaming agents, dispersion stabilizers, plasticizers, and pigments. In addition, oils such as paraffin-type, aroma-type and naphthene-type may also be added thereto. Further, the emulsion may be mixed with rubber latices such as an SBR latex, a chloroprene rubber latex, a polybutadiene latex and an ethylene propylene rubber latex and polymer emulsions such as an acrylic emulsion, a vinyl acetate emulsion, an EVA emulsion and a urethane emulsion. Or they may be used separately. However, if the dispersing emulsion is mixed with latices with different ionic properties, the latices are used in such an amount that operativeness is not deteriorated. In addition, water-reactive compounds such as cement, lime and isocyanate compounds may be used in a combination.

As a method of adding the oil, there are a method of converting oil-extended thermoplastic elastomer into a dispersing emulsion, a method of simultaneously dissolving a thermoplastic elastomer and the oil into the solvent to form a polymer solution, a method of mixing an oil emulsion with the dispersing emulsion of the present invention, and the like. An amount of the added oil is preferably 5 to 300 parts by weight based on 100 parts by weight of the thermoplastic elastomer.

When the dispersing emulsion of the present invention is used, there is generally used a method of transporting it after charged in a drum, a container or the like, and then introducing it by a pump into a coater or mixing equipment with another emulsion. In this case, there arises a problem that the thermoplastic elastomer and water as the dispersant are separated from each other in the container during storage or transportation and the concentration becomes unequal, so that an amount of coating or an amount of adding to another emulsion is also unequal, a constant coating thickness or a constant modifying effect cannot be achieved. Accordingly, the storage stability of the thermoplastic elastomer dispersed in the dispersing emulsion of the present invention is important. Further, when the dispersing emulsion of the present invention is introduced by a pump, there is a case that its emulsified and dispersed state is destroyed by shear force of the pump, the thermoplastic elastomer is separated from water as the dispersant, and the pump itself is clogged with the thermoplastic elastomer, and then performance of the pump is lowered or the pump cannot be used. Accordingly, the mechanical stability of the dispersing emulsion of the present invention is important.

Next, a method is explained below, which comprises preparing the dispersing emulsion of the present invention by dissolving the specified emulsifier into a solution comprising a thermoplastic elastomer and an organic solvent, then emulsifying the solution by mixing it with water and distilling the organic solvent.

After 100 parts by weight of the thermoplastic elastomer are dissolved in 100 to 500 parts by weight, preferably 200 to 450 parts by weight of an organic solvent, the specified emulsifier, or the specified emulsifier and a nonionic emulsifier other than the specified emulsifier are dissolved in the solution.

There is no particular limitation for a temperature and time for dissolving the thermoplastic elastomer in the organic solvent, the thermoplastic elastomer is preferably dissolved uniformly at 30 to 80° C. (usually for 2 to 3 hours). Further, toluene, xylene, cyclohexane or the like is preferably used as the organic solvent.

After the resulting solution of the thermoplastic elastomer containing the emulsifier in the organic solvent is adjusted to 30 to 80° C., preferably 40 to 60° C., it is mixed and emulsified with 100 to 300 parts by weight, preferably 125 to 275 parts by weight of water adjusted to 30 to 80° C., preferably 40 to 60° C., to prepare the emulsion.

As for mixing the above solution of the thermoplastic elastomer containing the emulsifier in the organic solvent with water, to water may be added the solution of the thermoplastic elastomer containing the emulsifier in the organic solvent. But it is preferable that water is added to the solution of the thermoplastic elastomer containing the emulsifier in the organic solvent from the viewpoint of obtaining an emulsion having a uniform particle diameter.

There is no particular limitation for the mixing. However, from the viewpoint of achieving suitable dispersion depending on the object and specifications by the continuous operation, the mixing is preferably conducted by using a multifunctional rotary machine which is a wet emulsifying and dispersing machine capable of a high degree of emulsification and dispersion, uniform mixing, pulverization and pumping mechanism. The machine gives strong impact with mega-hertz unit to liquid by a stator engaging with a highly rotating stirrer having a specific shape, thereby achieves an emulsifying and dispersing effect comparative to that of a high-pressure homogenizer and simultaneously transferring the treated materials (hereinafter referred to as "multifunctional rotary emulsifying and dispersing machine"). As the mixing machine used in mixing includes, examples thereof is Cavitron (made by Eurotech Co., Ltd.) capable of continuous emulsification, but it is not limited thereto.

From the prepared dispersing emulsion containing an organic solvent, the organic solvent is distilled away at 25 to 60° C. under reduced pressure of 720 to 640 mm/Hg (96.0 to 85.3 MPa) (distilled away usually to at most 0.3% by weight, preferably at most 0.2% by weight, more preferably at most 0.1% by weight), to prepare the dispersing emulsion of the present invention.

To distill the organic solvent away, there can be added water and a defoaming agent for adjusting a concentration of the dispersion while a nitrogen gas is passed, if necessary.

A temperature of the water is preferably the same as that of the dispersing emulsion containing an organic solvent. Examples of the defoaming agent are silicone-type defoaming agents. An amount thereof is usually about 0.1 to 2 parts by weight based on 100 parts by weight of the thermoplastic elastomer.

Since the dispersing emulsion from which the organic solvent is distilled away may been separated from water when its long-term storage stability is measured, a thickener may be added, if necessary. An amount of the thickener is determined from the viewpoint of good storage stability and readily usable viscosity of the obtained dispersing emulsion.

There can be further added antiseptics, if necessary.

Next, there is explained one example in where the thermoplastic elastomer is emulsified with the specified emulsifier or with the specified emulsifier and a nonionic emulsifier and an anionic emulsifier other than the specified emulsifier. This emulsification is also conducted in an almost similar manner to the emulsification of the thermoplastic elastomer with the specified emulsifier or with the specified emulsifier and a nonionic emulsifier other than the specified emulsifier.

From the viewpoint of preparing an emulsion with a uniform particle diameter, the anionic emulsifier is preferably dissolved after the specified emulsifier, or the specified emulsifier and a nonionic emulsifier other than the specified emulsifier, are dissolved in a solution of the thermoplastic elastomer in an organic solvent. The other procedure is the same as in emulsification of the thermoplastic elastomer with the specified emulsifier or with the specified emulsifier and a nonionic emulsifier other than the specified emulsifier.

When a thickener is used, a nonionic or anionic thickener is preferably used.

Because the dispersing emulsion prepared by this manner contains the anionic emulsifier, there arises the characteristic that there is no ion shock upon mixing with generally anionic emulsions such as a synthetic rubber latex, a vinyl acetate emulsion, an acrylic emulsion and vinyl chloride emulsion.

Next, there is explained one example in which the thermoplastic elastomer is emulsified with the specified emulsifier or with the specified emulsifier and a nonionic emulsifier and a cationic emulsifier other than the specified emulsifier. This emulsification is also conducted in an almost similar manner to emulsification of the thermoplastic elastomer with the specified emulsifier or with the specified emulsifier and a nonionic emulsifier other than the specified emulsifier.

The cationic emulsifier is preferably dissolved after the specified emulsifier, or the specified emulsifier and a nonionic emulsifier other than the specified emulsifier are dissolved in a solution of the thermoplastic elastomer in an organic solvent. The other procedure is the same as in emulsification of the thermoplastic elastomer with the specified emulsifier or with the specified emulsifier and a nonionic emulsifier other than the specified emulsifier.

When a thickener is used, a nonionic or cationic thickener is preferably used. Particularly, a cationic thickener, for example Hi-Set C-200 available from Dai-ichi Kogyo Seiyaku Co., Ltd., is preferably used.

Because the dispersing emulsion produced in this manner contains the cationic emulsifier, there arises the characteristic that a decomposition rate thereof becomes higher upon application onto inorganic materials such as cement mortal and building stone.

In the dispersing emulsion of the present invention produced in this manner, the specified nonionic emulsifier and optional other emulsifiers are used as the emulsifier for emulsification and dispersion of the thermoplastic elastomer and a thickener is further used. Therefore, it improves storage stability of the dispersing emulsion of the thermoplastic elastomer and stability (mechanical stability) thereof in use during transfer by a pump.

The dispersing emulsion of the present invention is preferably and suitably used as an emulsion for applications such as an asphalt modifier, coating paper, foam rubber, tire coatings, coatings (for cans, plastics, inorganic materials and wood as the substrate), painting, floor polishing, adhesives (aqueous adhesive, polymer cement, mortal adhesive and the like), sizing of carpets, automobile sheets, and mats, and waterproof materials; or the dispersing emulsion of the thermoplastic elastomer used for these applications to impart preferable properties thereto in case of mixing the emulsion used in these applications.

When the dispersing emulsion of the present invention is added as an asphalt modifier to asphalt, the asphalt modifier is usually added in a solid content of 1 to 20% by weight, preferably 2 to 14% by weight based on the asphalt. If the content is too low, the modifying effect cannot be sufficiently achieved, whereas it is too high, viscosity of the modified asphalt becomes too high to be practical. In addition, the modified asphalt becomes expensive.

There is no particular limitation for the asphalt to which the asphalt modifier of the present invention is added. Examples thereof are petroleum asphalt, natural asphalt, blown asphalt, semi-blown asphalt, resin-type asphalt (petroleum resin), guss asphalt and the like.

The following cases can be mentioned to modify asphalt with the asphalt modifier of the present invention.

(1) Modification of Hot Asphalt

The asphalt modifier is directly added with stirring to a hot asphalt, which is sufficiently melted for stirrable viscosity. Water is evaporated, and the thermoplastic elastomer is stirred until it is almost uniformly dissolved and dispersed in the asphalt.

(2) Modification of a Hot Asphalt Mixture

After coagulation and hot asphalt are mixed, the asphalt modifier is added to the mixture with stirring, water is evaporated, and the mixture is stirred until the thermoplastic elastomer is almost uniformly dissolved and dispersed in the asphalt. If the asphalt modifier is used in a recycled asphalt mixture, recycled materials (obtained by grinding generated materials that is an aged asphalt mixture generated from roads for recycle and then mixing them with a new asphalt mixture so as to be usable again) are mixed before the modifier of the present invention is added.

(3) Modification of an Asphalt Emulsion (a) An asphalt emulsion wherein asphalt is emulsified into water by using an anionic, nonionic or cationic emulsifier or a combination thereof (an anionic emulsifier and a cationic emulsifier are not usually combined) is mixed with the asphalt modifier and then stirred until they become uniform.

(b) An asphalt modifier is added to the hot asphalt, water is evaporated, and the mixture is stirred until the thermoplastic elastomer is almost uniformly dissolved and dispersed in the asphalt. It is mixed with an emulsifier and water to give an aqueous dispersing emulsion of the modified asphalt.

(c) An anionic, nonionic or cationic emulsifier or a combination thereof (an anionic emulsifier and a cationic emulsifier are not usually combined) is added to the asphalt modifier, and the hot asphalt is mixed therewith to give an aqueous dispersing emulsion.

(4) Modification of an Asphalt Mixture at a Room Temperature

The mixture of the asphalt emulsion and the asphalt modifier or the modified asphalt emulsion in the above (3) is applied to coagulation and mixed, or the asphalt emulsion and the asphalt modifier are separately applied to aggregate and mixed. The mixture is stirred until it becomes almost uniform. If used in a recycled asphalt mixture, recycled materials are further mixed.

When an aqueous dispersing emulsion-type modifier as the asphalt modifier of the present invention is used, there is generally used a method of transporting it after charged in a drum, a container or the like, and then introducing it into asphalt by a pump. In this case, if the thermoplastic elastomer and water as the dispersant are separated from each other in the container during storage or transportation, a concentration thereof becomes ununiform so that there arises the problem that a constant modifying effect cannot be achieved, or the thermoplastic elastomer separated in the added asphalt modifier is hardly dissolved in the asphalt. Accordingly, the storage stability of the thermoplastic elastomer in the asphalt modifier is important. Further, when the asphalt modifier is introduced by a pump, its emulsified and dispersed state is destroyed by shear force of the pump so that the thermoplastic elastomer is separated from water as the dispersant. As a result, there is a case in which dissolution of the thermoplastic elastomer in the asphalt is not sufficient, the pump itself is clogged with the thermoplastic elastomer, and then performance of the pump is lowered or the pump cannot be used. Accordingly, the mechanical stability of the asphalt modifier is important.

The asphalt modifier of the present invention is preferably used for modification of asphalt mixtures such as hot asphalt mixtures and foamed asphalt mixtures; asphalt emulsions for a room temperature asphalt mixtures; and asphalt in coating materials such as tack coatings, seal coatings and armor coatings. And it can be used for paving of roads, airports, gulfs, railroads, yards for railroad goods, stations, parking lots, sidewalks, bicycle roads, sport facilities, racing places, tennis courts, petroleum tank bases, hydraulic structures and places for waste disposal. Further, it can be used for modification of water-proof asphalt for civil engineering and in rooftops and roofs, asphalt for moisture-proof paper, building asphalt for floor soundproof materials for houses, floor materials and steel pipe coatings, and asphalt for other electrical insulating compounds and tunnel insulating materials.

EXAMPLES

The present invention is explained in more detail by referring to Examples, but the present invention is not limited thereto. In Examples, "%" and "parts" mean "% by weight" and "parts by weight", respectively, unless otherwise specified.

The evaluation methods used in Examples are collectively described below.

(Foaming)

To 100-ml Nessler tube is added 50 ml of the solution, which is obtained by diluting the aqueous thermoplastic elastomer dispersing emulsion 2-fold with water. It is stirred 30 times vertically by hand and then left, and an amount of foaming is measured with time.

(Viscosity)

A Brookfield rotational viscometer (BL type, made by Tohki Sangyo Co., Ltd.) is used.

A single-cylindrical rotor is rotated in a sample, viscosity is determined by shear rate and shear stress.

(Particle Diameter of Aqueous Thermoplastic Elastomer Emulsion)

The aqueous thermoplastic elastomer emulsion collected after distilling toluene in preparing the emulsion is evaluated by light diffraction with SALD2000 (made by Shimadzu Corporation).

(Storage Stability)

A Hitachi portable centrifuge (CT5DL) was used. A sample (aqueous thermoplastic elastomer emulsion) was collected in an amount that the total weight of the sample and the tare of the vessel (27φ×90 mm) was 135 g (sample: about 45 g).

Condition of centrifugation was 3000 rpm (1761 g)×10 minutes. One g of the aqueous thermoplastic elastomer emulsion at a lower part of the vessel after centrifugation was collected with a straw and weighed by a precision balance. Then, the weight thereof after evaporation and drying at 200° C.×15 minutes in an electric oven was measured, and the solid content was determined from the following equation:

$$\text{Solid content (\%)} = \frac{\text{Weight after evaporation and drying (g)}}{\text{Weight of collected sample (g)}} \times 100$$

(Pump Stability)

By using monoflex pump made by Nikkiso Eiko Co., Ltd. (FP-25 model, rotational speed of 1700 rpm), 10 kg of an aqueous thermoplastic elastomer emulsion (solid content of 50%) was circulated intermittently 2000 times, and an amount of formed coagulation was measured. The intermittent circulation was set by a timer to the repeated operating conditions "pump operation for 5 seconds and suspension for 5 seconds".

To measure an amount of the coagulation, the emulsion was circulated 2000 times by a pump and then filtered through a 120-mesh metal screen. A weight thereof after drying at 100° C. for 1 hour was measured by a precision balance, and an amount of the coagulation was determined as the ratio of the coagulation from the following equation:

$$\text{Coagulation ratio (\%)} = \frac{\text{Amount of coagulation}}{\text{Amount of sample (10 kg)}} \times 100$$

(Initial Tackiness)

An inclined-ball tack test was conducted according to JIS Z0237. The initial tack was evaluated with the number of balls kept in a tacky portion at an inclined angle of 30° at 25° C.

(Tackiness Strength)

A 180° peeling test was conducted according to JIS Z0237. As a test plate (subject), a stainless plate (size: 50 mm×50 mm×1.5 mm) was used, and a measurement temperature was set to 25° C.

(Holding Strength)

Holding strength was measured in an atmosphere at 40° C. and 100° C. according to JIS Z0237. The holding strength was evaluated with dropping time under 100 g loading.

(Adhesion Under a High Temperature Environment)

An adhesive tape with a length of 60 mm and a width of 25 mm was attached to the periphery of a glass bar with a diameter of 2 cm and cured at a room temperature for 24 hours. After it was left in an atmosphere at 150° C. for 1 hour, state of the attached adhesive tape was visibly observed and evaluated under the following criteria:

○: The same attached state as the state before leaving.

Δ: An edge of the adhesive tape was observed to be lifted.

×: At least half of the adhesive tape was observed to be lifted.

(Chipping Resistance)

A test specimen was jetted 5 times with 500 g of No. 6 gravel at 5 kg/cm² pressure in a gravel testing machine. The state of the test specimen was visibly observed and evaluated under the following criteria:

○: Not damaged.

Δ: There is ply peeling.

×: There is interfacial peeling.

(Soundproofing)

A steel ball with a diameter of 10 mm was dropped from a height of 1 m to a coating face of a test specimen, the resulting collision sound was measured 5 times with a sound-level meter and the average sound level was obtained. A smaller sound level is indicative of a higher soundproof effect.

(Adhesion)

A test specimen was measured 3 times according to a tape peeling method (2 mm cross cut) in accordance with JIS K5400 to obtain the average thereof. A higher value is indicative of higher adhesion.

(Asphalt Property)

Straight asphalt (The penetration was 60 to 80, available from Cosmo Oil Co., Ltd., hereinafter referred to as Cosmo 60 to 80) was heated to 170° C. An asphalt modifier was mixed therewith under the condition of a velocity of 400 to 500 rpm by a stirrer having 4 stirring blades.

An amount of the asphalt modifier converted to solid content was 6 parts based on 100 parts of the straight asphalt (Cosmo 60 to 80).

Physical properties of asphalt were evaluated according to a method described in "Standard Test Methods for Paving Materials" published on Nov. 10, 1988 by Japan Road Association.

(Properties of Asphalt Emulsion-evaporated Residues)

An asphalt modifier was added to a commercial asphalt emulsion (PK-4, available from Toho Rika Co., Ltd.), and the asphalt modifier was mixed for 10 minutes under the condition of a velocity of 400 to 500 rpm with a stirrer with 4 stirring blades. After the mixture was heated to 90 to 95° C. under stirring to evaporate a majority of water. Further, the mixture was heated to 130 to 140° C. to completely evaporate water to obtain asphalt emulsion-evaporated residues.

A rate of penetration, softening point, elongation, toughness and tenacity of the obtained asphalt emulsion-evaporated residues were measured according to methods described in "Standard Test Methods for Paving Materials".

Next, the major materials used in Examples 1 to 35 and Comparative Examples 1 to 13, as well as abbreviations thereof are described below.

Thermoplastic Elastomer

SBS: TR2626C available from JSR Corporation, a molecular weight of about 170,000, a styrene content of 30%, a molecular weight of a polystyrene block of about 26,000, a molecular weight of a polybutadiene block of about 120,000

Emulsifier

Benzylated phenol EOA: A product obtained by adding 20 moles of ethylene oxide to phenol add d with average 2 benzyl groups (mono:di:tri or more=18:48:34).

Styrenated phenol EOA: A product obtained by adding 20 moles of ethylene oxide to phenol added with average 2 styrene groups (mono:di:tri or more=15:50:35).

Polyalkylene polyamine EOA: A block adduct of 20 moles of polyethylene imine (MW 1200) propylene oxide and 125 moles of ethylene oxide.

Polyalcohol fatty ester EOA Sorgen TW-60, available from Dai-ichi Kogyo Seiyaku Co., Ltd.

Nonyl phenol EOA: An adduct of 20 moles of nonyl phenol and ethylene oxide.

Rosin soap: Rondis K-80, available from Arakawa Kagaku Kogyo Co., Ltd.

Nonyl phenol EOA Na sulfate: Nonyl phenol ethylene oxide (7 moles)-added sodium sulfate.

Nonyl phenol EOA Na phosphate: Polyoxyethylene (6 moles of EO) nonyl phenyl ether sodium phosphate.

LDMEAES: Lauryl dimethy ethyl ammonium ethyl sulfate.

Thickeners

Hydroxypropyl methyl cellulose: Methyl cellulose PMC40U, available from Sansei Seimitsu Kagaku Co., Ltd.

Hydroxyethyl methyl cellulose: Cesca MHEC6000PR, available from Dai-ichi Kogyo Seiyaku Co., Ltd.

Dimethyl aminoethyl methacrylate-methyl chloride quaternary salt polymer: Hi-Set C-200, available from Dai-ichi Kogyo Seiyaku Co., Ltd.

Diallyl dimethyl ammonium chloride polymer: Shallol DC-303P, available from Dai-ichi Kogyo Seiyaku Co., Ltd.

CMC: Cellogen HE-1500F, available from Dai-ichi Kogyo Seiyaku Co., Ltd.

Xanthan gum: Xanthan gum, available from Kelco Co., Ltd.

Rumzan gum: Rumzan gum, available from Kelco Co., Ltd.

Bentonite: VEEGUM-T, available from R. T. VANDERBILT Co., Ltd.

Example 1

An emulsifying machine equipped with a disper, a mixer and an anchor (TK Combi-Mix type, made b r Tokushukika Kogyo Co., Ltd.) was charged with 100 parts (20 kg) of SBS and 400 parts (80 kg) of toluene. And the mixture was heated to 60° C. to dissolve SBS.

After the SBS was dissolved 10 parts (2 kg) of benzylated phenol EOA was introduced as an emulsifier, 250 parts (50 kg) of hot water (60° C.) was added dropwise and uniformly for 30 minutes at an emulsifying temperature of 60° C. at a mixer peripheral speed of 12.8 m/s, at a disper peripheral speed of 9.6 m/s and an anchor rotation speed of 60 rpm. After adding, the mixture was stirred for 10 minutes to obtain an SBS dispersing emulsion.

Thereafter, toluene was distill d away at 60° C. and 720 to 640 mmHg (96.0 to 85.3 MPa) until an amount of the remaining toluene was decreased to at least 0.05%. The foaming of the resulting aqueous SBS emulsion was 22 ml just after preparation, 12 ml after 1 minute and 5 ml after 5 minutes.

Viscosity, particle diameter storage stability and pump stability of the obtained aqueous SBS emulsion (solid content of 50% by weight) were measured. The results are shown in Table 1.

Examples 2 to 5 and Comparative Examples 1 to 4

The starting materials show in Table 1 were used in amounts shown in Table 1 to prepare and evaluate aqueous SBS emulsions in the same manner as in Example 1. The results are shown in Table 1.

In Example 3 and Comparative Example 3, 0.7 part (140 g) of CMC (carboxymethyl cellulose Na salt) in the form of powder was added to the aqueous SBS emulsions (solid content: 55% by weight). obtained in Example 2 and Comparative Example 2 Then, water was added thereto in an amount that the solid content became 50%, and the mixture was stirred (2000 rpm) and left for 12 hours to dissolve the CMC, whereby the dispersing emulsion was obtained.

Example 6

There were mixed 80 parts of the aqueous SBS dispersing emulsion with a solid content of 50% obtained in Example 2 with 20 parts of the anionic SBR latex with a solid content of 50% (JSR0678, available from JSR Corporation), and properties thereof were measured. The results are shown in Table 1.

TABLE 1

| Example No. | 1 | 2 | 3 | 4 | 5 | 6 | Comparative Example 1 | 2 | 3 | 4 |
|---|---|---|---|---|---|---|---|---|---|---|
| Composition (parts) | | | | | | | | | | |
| SBS | 100 | 100 | 100 | 100 | 100 | * | 100 | 100 | 100 | 100 |
| Benzylated phenol EOA | 10 | — | — | — | — | | — | — | — | — |
| Styrenated phenol EOA | — | 10 | 10 | — | — | | — | — | — | — |
| Polyalkylene polyamine EOA | — | — | — | 10 | — | | — | — | — | — |
| Polyalcohol fatty acid ester EOA | — | — | — | — | 10 | | — | — | — | — |
| Nonyl phenol EOA Na sulfate | — | — | — | — | — | | 5 | — | — | — |
| Nonyl phenol EOA Na phosphate | — | — | — | — | — | | — | 5 | 5 | — |
| Nonyl phenol EOA | — | — | — | — | — | | — | — | — | 10 |
| CMC | — | — | 0.7 | — | — | | — | — | 0.7 | — |
| Results | | | | | | | | | | |
| Foaming (ml) | | | | | | | | | | |
| just after preparation | 22 | 22 | 21 | 21 | 23 | 21 | 37 | 35 | — | 25 |
| after 1 minute | 12 | 12 | 13 | 13 | 14 | 13 | 37 | 35 | — | 11 |
| after 5 minutes | 5 | 4 | 4 | 6 | 5 | 4 | 20 | 19 | — | 10 |
| Viscosity (mPa · s) | 180 | 185 | 1900 | 175 | 180 | 190 | 175 | 190 | — | 220 |
| Particle diameter (μm) | 1.8 | 1.9 | 1.8 | 1.9 | 1.9 | 1.8 | 1.7 | 1.8 | — | 2.1 |
| Storage stability | | | | | | | | | | |
| Total solid content before centrifugation (%) | 50.0 | 50.0 | 50.0 | 50.0 | 50.0 | 50.0 | 50.0 | 50.0 | 50.0 | 50.0 |
| Total solid content after centrifugation (%) | 48.1 | 48.3 | 48.6 | 48.2 | 48.5 | 48.4 | 20.5 | 45.3 | 45.8 | 47.9 |

TABLE 1-continued

|  | | | | | | | Comparative Example | | | |
|---|---|---|---|---|---|---|---|---|---|---|
| Example No. | 1 | 2 | 3 | 4 | 5 | 6 | 1 | 2 | 3 | 4 |
| Pump stability | | | | | | | | | | |
| Amount of coagulation (%) | 0.02 | 0.01 | 0.01 | 0.01 | 0.02 | 0.01 | 0.02 | 25.33 | 25.78 | 20.65 |

*Mixture of 80 parts of the aqueous dispersing emulsion obtained in Example 2 and 20 parts of anionic SBR latex

Example 7

An emulsifying machine (TK Combi-Mix type, made by Tokushukika Kogyo Co., Ltd.) equipped with a disper, a mixer and an anchor was charged with 100 parts (20 kg) of SBS and 400 parts (80 kg) of toluene. The mixture was heated to 60° C. to dissolve SBS.

After the SBS was dissolved, 5 parts (1.0 kg) of benzylated phenol EOA and 3 parts (0.6 kg) of rosin soap were introduced as an emulsifier, and 250 parts (50 kg) of hot water (60° C.) was added dropwise and uniformly for 30 minutes at an emulsifying temperature of 60° C. at a mixer peripheral speed of 12.8 m/s, at disper peripheral speed of 9.6 m/s and an anchor rotation speed of 60 rpm. After adding, the mixture was stirred for 10 minutes to obtain an SBS dispersing emulsion.

Thereafter, toluene was distilled away at 60° C. and 720 to 640 mmHg, until an amount of the remaining toluene was decreased to at most 0.05% by weight. Foaming of the obtained aqueous SBS emulsion was 23 ml just after preparation, 11 ml after 1 minute and 5 ml after 5 minutes.

Particle diameter, viscosity storage stability and pump stability of the obtained aqueous SBS emulsion (solid content, 50% by weight) were measured. The results are shown in Table 2.

Examples 8 to 9 and Comparative Examples 5 to 7

The starting materials shown n Table 2 were used in amounts shown in Table 2 to prepare and evaluate aqueous SBS emulsions in the same manner as in Example 7. The results are shown in Table 2.

In Example 9 and Comparative Example 7, 0.7 part (140 g) of CMC (carboxymethyl cellulose Na salt) in the form of powder was added to the aqueous SBS emulsion (solid content: 55% by weight) obtained in Example 7 and Comparative Example 6. Then, water was added thereto in an amount that the solid content became 50% by weight, the mixture was stirred (2000 rpm) and left for 12 hours to dissolve the CMC, whereby the dispersing emulsion was obtained.

Example 10

There were mixed 80 parts of the aqueous SBS dispersing emulsion with a solid content of 50% obtained in Example 8 with 20 parts of SBR latex with a solid content of 50% (JSR0678, available from JSR Corporation), and properties thereof were measured. The results are shown in Table 2.

TABLE 2

|  | | | | | Comparative Example | | |
|---|---|---|---|---|---|---|---|
| Example No. | 7 | 8 | 9 | 10 | 5 | 6 | 7 |
| Composition (parts) | | | | | | | |
| SBS | 100 | 100 | 100 | * | 100 | 100 | 100 |
| Benzylated phenol EOA | 5 | — | 5 | | — | — | — |
| Styrenated phenol EOA | — | 5 | — | | — | — | — |
| Rosin soap | 3 | 3 | 3 | | — | — | — |
| Nonyl phenol EOA Na sulfate | — | — | — | | 5 | — | — |
| Nonyl phenol EOA Na phosphate | — | — | — | | — | 5 | 5 |
| CMC | — | — | 0.7 | | — | — | 0.7 |
| Results | | | | | | | |
| Foaming (ml) | | | | | | | |
| just after preparation | 23 | 24 | — | — | 35 | 35 | — |
| after 1 minute | 11 | 12 | — | — | 34 | 35 | — |
| after 5 minutes | 5 | 3 | — | — | 20 | 18 | — |
| Viscosity (mPa · s) | 180 | 185 | — | — | 170 | 195 | — |
| Particle diameter (μm) | 1.8 | 1.8 | — | — | 1.7 | 1.9 | — |
| Storage stability | | | | | | | |
| Total solid content before centrifugation (%) | 50.0 | 50.0 | 50.0 | 50.0 | 50.0 | 50.0 | 50.0 |
| Total solid content after centrifugation (%) | 48.4 | 48.3 | 48.7 | 48.3 | 20.8 | 46.3 | 47.8 |
| Pump stability | | | | | | | |
| Amount of coagulation (%) | 0.02 | 0.01 | 0.02 | 0.01 | 0.03 | 27.30 | 26.12 |

*Mixture of 80 parts of the aqueous dispersing emulsion obtained in Example 8 and 20 parts of anionic SBR latex

Example 11

An emulsifying machine (TK Combi-Mix type, made by Tokushukika Kogyo Co., Ltd.) equipped with a disper, a mixer and an anchor was charged with 100 parts (20 kg) of SBS and 400 parts (80 kg) of toluene. The mixture was heated to 60° C. to dissolve SBS.

After the SBS was dissolved, 5 parts (1.0 kg) of benzylated phenol EOA and 5 parts (1.0 kg) of LDMEAES were introduced as an emulsifier, and 250 parts (50 kg) of hot water (60° C.) was added dropwise and uniformly for 30 minutes at an emulsifying temperature of 60° C. at a mixer peripheral speed of 12.8 m/s, at a disper peripheral speed of 9.6 m/s and an anchor rotation speed of 60 rpm. After adding, the mixture was stirred for 10 minutes to obtain an SBS dispersing emulsion.

Thereafter, toluene was distilled away at 60° C. and 720 to 640 mmHg, until an amount of the remaining toluene was decreased to at most 0.05% by weight. Foaming of the obtained aqueous SBS emulsion was 20 ml just after preparation, 12 ml after 1 minute and 4 ml after 5 minutes.

Viscosity, particle diameter, storage stability and pump stability of the obtained aqueous SBS emulsion (solid content, 50% by weight) were determined. The results are shown in Table 3.

Example 12

An SBS dispersing emulsion was obtained and evaluated in the same manner as in Example 11 except that 5 parts of styrenated phenol EOA were used in place of 5 parts of the benzylated phenol EOA used in Example 11. The results are shown in Table 3.

Examples 13 to 17 and Comparative Examples 8 to 10

The starting materials shown in Table 3 were used in amounts shown in Table 3 to produce and evaluate an aqueous SBS emulsion in the same manner as in Example 11. The results are shown in Table 3.

In Examples 13 to 17 and Comparative Example 10, 0.7 part (140 g) of CMC (carboxymethyl cellulose Na salt) in the form of powder as a thickener, e.g. in Comparative Example 10, was added to the aqueous SBS emulsion (solid content: 55% by weight) obtained in Comparative Example 9. Then, water was added thereto in an amount that the solid content became 50% by weight, and the mixture was stirred (2000 rpm) and left for 12 hours to dissolve the CMC, whereby the dispersing emulsion was obtained. In Examples 13 to 17, a thickener shown in Table 3 was used in an amount shown in Table 3, and the same procedure was conducted.

Example 18

A product was prepared by mixing 80 parts of the aqueous SBS dispersing emulsion having a solid content of 50% by weight obtained in Example 12 with 20 parts of the cationic SBR latex having a solid content of 50% (ROADEX K, available from JSR Corporation) to evaluate properties. The results are shown in Table 3.

TABLE 3

| Example No. | 11 | 12 | 13 | 14 | 15 | 16 | 17 | 18 | Comparative Example 8 | 9 | 10 |
|---|---|---|---|---|---|---|---|---|---|---|---|
| Composition (parts) | | | | | | | | | | | |
| SBS | 100 | 100 | 100 | 100 | 100 | 100 | 100 | * | 100 | 100 | 100 |
| Benzylated phenol EOA | 5 | — | — | — | 5 | — | — | | — | — | — |
| Styrenated phenol EOA | — | 5 | 5 | 5 | — | 5 | 5 | | — | — | — |
| LDMEAES | 5 | 5 | 5 | 5 | 5 | 5 | 5 | | — | — | — |
| Nonyl phenol EOA Na sulfate | — | — | — | — | — | — | — | | 5 | — | — |
| Nonyl phenol EOA Na phosphate | — | — | — | — | — | — | — | | — | 5 | 5 |
| Hydroxy propyl methyl cellulose | — | — | 0.5 | — | 0.5 | — | — | | — | — | — |
| Hydroxy ethyl methyl cellulose | — | — | — | 0.5 | — | — | — | | — | — | — |
| Dimethyl amino ethyl methacrylate.methyl chloride quaternary salt polymer | — | — | — | — | — | 1.6 | — | | — | — | — |
| Diallyl dimethyl ammonium chloride polymer | — | — | — | — | — | — | 1.6 | | — | — | — |
| CMC | — | — | — | — | — | — | — | | — | — | 0.7 |
| Results | | | | | | | | | | | |
| Foaming (ml) | | | | | | | | | | | |
| just after preparation | 20 | 23 | 21 | 23 | 23 | 22 | 22 | 23 | 37 | 35 | — |
| after 1 minute | 12 | 15 | 12 | 11 | 14 | 13 | 16 | 15 | 30 | 33 | — |
| after 5 minutes | 4 | 5 | 4 | 4 | 4 | 5 | 5 | 5 | 19 | 18 | — |
| Viscosity (mPa · s) | 185 | 190 | 2000 | 2200 | 2400 | 2100 | 2100 | 1000 | 185 | 195 | — |
| Particle diameter (μm) | 1.8 | 1.9 | 1.8 | 1.9 | 1.9 | 1.8 | 2.0 | 1.9 | 1.7 | 1.8 | — |
| Storage stability | | | | | | | | | | | |
| Total solid content before centrifugation (%) | 50.0 | 50.0 | 50.0 | 50.0 | 50.0 | 50.0 | 50.0 | 50.0 | 50.0 | 50.0 | 50.0 |
| Total solid content after centrifugation (%) | 48.2 | 48.1 | 48.9 | 48.2 | 48.9 | 48.7 | 49.2 | 49.3 | 20.8 | 46.3 | 48.8 |
| Pump stability | | | | | | | | | | | |
| Amount of coagulation (%) | 0.01 | 0.01 | 0.02 | 0.01 | 0.02 | 0.01 | 0.01 | 0.02 | 0.03 | 25.00 | 24.78 |

*Mixture of 80 parts of the aqueous dispersing emulsion obtained in Example 12 and 20 parts of cationic SBR latex

Example 19

An emulsifying machine (TK Combi-Mix type, made by Tokushukika Kogyo Co., Ltd.) equipped with a disper, a mixer and an anchor was charged with 100 parts (20 kg) of SBS and 400 parts (80 kg) of toluene. The mixture was heated to 60° C. to dissolve SBS.

After SBS was dissolved, 5 parts (1.0 kg) of benzylated phenol EOA and 3 parts (0.6 kg) of rosin soap were introduced as an emulsifier, and hot water (60° C.) was added dropwise and uniformly for 30 minutes at an emulsifying temperature of 60° C. at a mixer peripheral speed of 12.8 m/s, at a disper peripheral speed of 9.6 m/s and an anchor rotation speed of 60 rpm. After adding, the mixture was stirred for 10 minutes to obtain an SBS dispersing emulsion.

Thereafter, toluene was distilled away at 60° C. and 720 to 640 mmHg until an amount of the remaining toluene was decreased to at most 0.05%. Foaming of the obtained aqueous SBS emulsion was 22 ml just after production, 14 ml after 1 minute and 5 ml after 5 minutes.

To the aqueous SBS emulsion (solid content, 55%) was added 0.3 part (60 g) of xanthan gum in the form of powder. Water was added in an amount that the solid content became 50%, and the mixture was stirred (2000 rpm). Thereafter, the mixture was left for 12 hours to dissolve xanthan gum.

Particle diameter of the obtained . aqueous dispersing emulsion, viscosity thereof before and after the xanthan gum addition, and the storage stability thereof were measured. The results are shown in Table 4.

Examples 20 to 25 and Comparative Examples 11

The starting materials shown in Table 4 were used in amounts shown in Table 4 to prepare and evaluate an aqueous dispersing emulsion in the same manner as in Example 19. The results are shown in Table 4.

Example 26

There were mixed 80 parts of the aqueous SBS dispersing emulsion having a solid content of 50% obtained in Example 20 with 20 parts by weight of SBR latex having a solid content of 50% (JSR0678, available from JSR Corporation) and properties thereof were measured. The results are shown in Table 4.

TABLE 4

| Example No. | 19 | 20 | 21 | 22 | 23 | 24 | 25 | 26 | Comparative Example 11 |
|---|---|---|---|---|---|---|---|---|---|
| Composition (parts) | | | | | | | | | |
| SBS | 100 | 100 | 100 | 100 | 100 | 100 | 100 | | 100 |
| Xanthan gum | 0.3 | 0.3 | 0.3 | — | 0.2 | 0.2 | 0.2 | | — |
| Rumzan gum | — | — | — | 0.2 | — | — | 0.1 | | — |
| CMC | — | — | — | — | 0.2 | — | — | * | — |
| Bentonite | — | — | — | — | — | 0.3 | — | | — |
| Benzylated phenol EOA | 5 | — | — | — | — | — | — | | — |
| Styrenated phenol EOA | — | 5 | 5 | 5 | 5 | 5 | 5 | | — |
| Rhodine | 3 | 3 | — | 3 | 3 | 3 | 3 | | — |
| Nonyl phenol EOA Na sulfate | — | — | — | — | — | — | — | | 5 |
| LDMEAES | — | — | 5 | — | — | — | — | | — |
| Results | | | | | | | | | |
| Foaming (ml) | | | | | | | | | |
| just after production | 22 | 23 | 24 | 22 | 23 | 21 | 21 | — | 35 |
| after 1 minute | 14 | 15 | 13 | 11 | 16 | 12 | 12 | — | 34 |
| after 5 minutes | 5 | 4 | 6 | 3 | 5 | 3 | 4 | — | 19 |
| Viscosity (mPa · s) | | | | | | | | | |
| without thickener | 185 | 195 | 180 | 195 | 180 | 160 | 185 | 190 | 185 |
| with thickener | 1130 | 1212 | 1300 | 1170 | 2100 | 1323 | 1480 | 1002 | — |
| Particle diameter (μm) | 1.8 | 1.9 | 1.7 | 1.8 | 2.0 | 1.9 | 1.8 | 1.8 | 1.7 |
| Storage stability | | | | | | | | | |
| Total solid content before centrifugation (%) | 50.0 | 50.0 | 50.0 | 50.0 | 50.0 | 50.0 | 50.0 | 50.0 | 50.0 |
| Total solid content after centrifugation (%) | 50.0 | 50.0 | 49.8 | 49.7 | 49.2 | 49.9 | 50.0 | 48.3 | 24.7 |

*Mixture of 80 parts of the aqueous dispersing emulsion obtained in Example 20 and 20 parts of anionic SBR latex

Examples 27 to 29 and Comparative Examples 12

A commercial acrylic emulsion (AE200, available from JSR Corporation) and the anionic dispersing emulsion (SBS emulsion) obtained in Example 7 were mixed in an amount shown in Table 5. After 100 parts (solid content) of the obtained mixture was adjusted to pH 8 by adding 0.1 part of 25% ammonia water, 0.1 part of a polycarboxylic acid-based emulsion-type thickener (Primal ASE-60, Nippon Acryl Kogyo Co., Ltd.) was added thereto to prepare an aqueous pressure-sensitive adhesive having a viscosity of 10,000 mPa·s (BM type).

The obtained aqueous pressure-sensitive adhesive was applied by an applicator having a gap of 15/10,000 inch onto the substrate surface comprising polyester film (thickness, 25 μm). The resulting coating was dried at 110° C. for 1 minute to prepare an adhesive tape having an adhesive layer (20 to 25 g/m²) formed on the substrate surface.

By using the obtained adhesive tape, properties shown in Table 5 were evaluated. The results are shown in Table 5.

TABLE 5

| Example No. | 27 | 28 | 29 | Comparative Example 12 |
|---|---|---|---|---|
| Mixture ratio(parts) | | | | |
| SBS emulsion(solid content) | 10 | 20 | 30 | 0 |
| Commercial acrylic emulsion (solid content) | 90 | 80 | 70 | 100 |
| Results | | | | |
| Initial tackiness(ball No.) | 12 | 12 | 11 | 11 |
| Tackiness strength(g/25 mm) | 900 | 780 | 750 | 900 |
| Holding strength(40° C.) (Hr) | >4 | >48 | >48 | 18 |
| Holding strength(100° C.) (Hr) | >12 | >12 | >12 | 6 |
| Tackiness at a high temperature (visibly observed) | ○ | ○ | ○ | Δ |

The SBS emulsion of the present invention can be suitably used as a modifier for the aqueous pressure-sensitive adhesive.

The aqueous pressure-sensitive adhesive using the SBS emulsion of the present invention exhibits excellent adhesion to an adherent and also exhibits suitable adhesion even at a high-temperature environment, and is excellent in thermal stability.

Examples 30 to 32 and Comparative Examples 13

To 100 parts (solid content) of a product prepared by mixing a commercial SBR latex (JSR0545, available from JSR Corporation) and the anionic SBS emulsion obtained in Example 7 in an amount shown in Table 6 was added 0.2 part of a dispersant (Alon A-20, available from Alon Kasei Co., Ltd.), 150 parts of calcium carbonate, 50 parts of talc and a thickener in an amount suitable for adjusting the coating viscosity to 30,000 mPa·s (BM type). Then, water was added thereto to prepare a coating in a total coating solid content of 70%.

The obtained mixture was applied by an airless spray onto an automobile steel sheet of 0.8 mm in thickness, to form a coating of 1.6 mm in thickness thereon. Thereafter, it was dried at 90° C. for 10 minutes and at a room temperature for 1 day.

By using the obtained test specimen, properties shown in Table 6 were evaluated. The results are shown in Table 6.

TABLE 6

| Example No. | 30 | 31 | 32 | Comparative Example 13 |
|---|---|---|---|---|
| Mixture ratio(parts) | | | | |
| SBS emulsion(solid content) | 100 | 70 | 50 | 0 |
| Commercial SBR latex(solid content) | — | 30 | 50 | 100 |
| Results | | | | |
| Chipping resistance | ○ | ○ | ○ | Δ |
| Soundproofing(Db(A)) | 80 | 85 | 85 | 95 |
| Adhesion(10 points method) | 10 | 10 | 8 | 6 |

The SBS emulsion of the present invention is excellent in chipping resistance, soundproofing and adhesion, and is useful for an aqueous chipping-resistant coating.

Example 33

At 50° C., 200 parts of SBS were dissolved in 466 parts of toluene, 20 parts of styrenated phenol EOA were added thereto and dissolved. Thereafter, the mixture was continuously emulsified with 285 parts of water at 50° C. by a multifunctional rotary emulsifying and dispersing machine (Cavitron made by Eurotech Co., Ltd., operating conditions: sealing pressure of at least 60 kg/cm$^2$). After completing emulsification, 1.0 g of a defoaming agent was added, and the toluene was distilled away at 35 to 40° C. under reduced pressure (720 to 640 mmHg) while the liquid level was kept constant by adding water. A toluene content was made at most 0.1% and the solid content was made at least 50%. Thereafter, 0.8 part of xanthan gum was added thereto and was left for 1 day, then volatile components were adjusted to 48 to 50%, and an antiseptic was added thereto in an amount of 500 ppm based on the total water.

The obtained dispersing emulsion had a solid content of 51.0%, viscosity of 1200 mPa·s, pH 9.96 and an average particle diameter of 1.60 μm.

Example 34

At 50° C., 200 parts of SBS were dissolved in 466 parts of toluene, and then 10 parts of styrenated phenol EOA were added thereto and dissolved. And 11.1 parts of LDMEAES were added and dissolved. Thereafter, the mixture was continuously emulsified with 285 parts of water at 50° C. by a multifunctional rotary emulsifying and dispersing machine (Cavitron made by Eurotech Co., Ltd., operating conditions: sealing pressure of at least 60 kg/cm$^2$). After completion of emulsification, 1.0 g of a defoaming agent was added, and the toluene was distilled away at 35 to 40° C. under reduced pressure (720 to 640 mmHg) while the liquid level was kept constant by adding water. The toluene content was made at most 0.1%, and the solid content was made at least 50%. Thereafter, 4.4 parts of Hi-Set C200 was added thereto and left for 1 day, then the volatile components were adjusted to 48 to 50%, an antiseptic was added thereto in an amount of 500 ppm based on the total water.

The obtained dispersing emulsion had a solid content of 50.3%, viscosity of 2992 mPa·s, pH 9.12 and an average particle diameter of 1.38 μm.

Example 35

At 50° C., 200 parts of SBS were dissolved in 466 parts of toluene, and then 10 parts of styrenated phenol EOA were added thereto and dissolved, and 7.5 parts of rosin soap were added thereto and dissolved. Thereafter, the mixture was continuously emulsified with 285 parts of water at 50° C. by a multifunctional rotary emulsifying and dispersing machine (Cavitron made by Eurotech Co., Ltd., operating conditions: sealing pressure of at least 60 kg/cm$^2$). After completion of emulsification, 1.0 g of a defoaming agent was added, and the toluene was distilled away at 35 to 40° C. under reduced pressure (720 to 640 mmHg) while the liquid level was kept constant by adding water. The toluene content was made at most 0.1%, and the solid content was made at least 50%. Thereafter, 0.9 part of xanthan gum was added thereto and left for 1 day, then the volatile components were adjusted to 48 to 50%, and an antiseptic was added thereto in an amount of 500 ppm based on the total water.

The obtained dispersing emulsion had a solid content of 50.3%, viscosity of 1024 mPa·s, pH 9.87 and an average particle diameter of 1.39 μm.

Next, the major materials used in Examples 36 to 63 and Comparative Examples 14 to 24, as well as abbreviations thereof, are explained below.

Thermoplastic Elastomer

SBS: TR2606C available from JSR Corporation, a molecular weight of about 460,000, a styrene content of 30%

Emulsifier

Benzylated phenol EOA: A product obtained by adding 20 moles of ethylene oxide to phenol added with average 2 benzyl groups Styrenated phenol EOA: A product obtained by adding 20 moles of ethylene oxide to phenol added with average 2 styrene groups Polyalkylene polyamine EOA: Discoal N-518, available from Dai-ichi Kogyo Seiyaku Co., Ltd.

Polyalcohol fatty ester EOA: Sorgen TW-60, available from Dai-ichi Kogyo Seiyaku Co., Ltd.

LDMEAES: Lauryl dimethyl ethyl ammonium ethyl sulfate

Rosin soap: Rondis K-80, available from Arakawa Kagaku Kogyo Co., Ltd.

Nonyl phenol EOA Na sulfate: Nonyl phenol ethylene oxide (7 moles)-added sodium sulfate Nonyl phenol EOA Na phosphate: Polyoxyethylene (6 moles of EO) nonyl phenyl ether sodium phosphate Nonyl phenol EOA: An adduct of 20 moles of nonyl phenol and ethylene oxide Thickener Xanthan gum: Xanthan gum, available from Kelco Co., Ltd.

Rumzan gum: Rumzan gum, available from Kelco Co., Ltd.

Hydroxypropyl methyl cellulose: Methyl cellulose PMC40U, available from Sansei Seimitsu Kagaku Co., Ltd.

Hydroxyethyl methyl cellulose: Cesca MHEC6000PR, available from Dai-ichi Kogyo Seiyaku Co., Ltd.

Dimethyl aminoethyl methacrylate methyl chloride quaternary salt polymer: Hi-Set C-200, availabole from Dai-ichi Kogyo Seiyaku Co., Ltd.

Diallyl dimethyl ammonium chloride polymer: Shallol DC-303P, Dai-ichi Kogyo Seiyaku Co., Ltd.

CMC: Cellogen HE-1500F, available from Dai-ichi Kogyo Seiyaku Co., Ltd.

Bentonite: Veegum-T, available from R. T. Vanderbilt Co., Ltd.

Example 36

An emulsifying machine (TK Combi-Mix type, made by Tokushukika Kogyo Co., Ltd.) equipped with a disper, a mixer and an anchor was charged with 100 parts (20 kg) of SBS and 400 parts (80 kg) of toluene. The mixture was heated to 60° C. to dissolve SBS.

After the SBS was dissolved, 10 parts (2 kg) of benzylated phenol EOA was introduced as an emulsifier, and 250 parts (50 kg) of hot water (60° C.) was added dropwise and uniformly for 30 minutes at an emulsifying temperature of 60° C. at a mixer peripheral speed of 12.8 m/s, at a disper peripheral speed of 9.6 m/s and an anchor rotation speed of 60 rpm. After addition, the mixture was stirred for 10 minutes to obtain an SBS dispersing emulsion.

Thereafter, toluene was distilled away at 60° C. and 720 to 640 mmHg until an amount of the remaining toluene was decreased to at most 0.05%. Foaming of the obtained aqueous SBS emulsion was 23 ml just after production, 13 ml after 1 minute and 6 ml after 5 minutes.

Viscosity, particle diameter, storage stability, asphalt properties, and pump stability of the obtained aqueous SBS emulsion (solid content, 50% by weight) were determined. The results are shown in Table 7.

Examples 37 to 40 and Comparative Examples 14 to 17

The starting materials shown in Table 7 were used in amounts shown in Table 7 to prepare and evaluate an aqueous SBS emulsion in the same manner as in Example 36. The results are shown in Table 7.

In Example 38 and Comparative Example 16, 0.7 part (140 g) of CMC (carboxymethyl cellulose Na salt) in the form of powder was added to the aqueous SBS emulsion (solid content: 55%) obtained in Example 37 and Comparative Example 15. Then, water was added thereto in an amount that the solid content became 50%, and the mixture was stirred (2000 rpm) and left for 12 hours to dissolve the CMC, whereby the dispersing emulsion was obtained.

Example 41

There were mixed 80 parts of the aqueous SBS dispersing emulsion having a solid content of 50% obtained in Example 37 and 20 parts of an anionic SBR latex having a solid content of 50% (JSR0678, available from JSR Corporation) to measure asphalt properties thereof. The results are shown in Table 7.

TABLE 7

| Example No. | 36 | 37 | 38 | 39 | 40 | 41 | Comparative Example | | | | Reference |
|---|---|---|---|---|---|---|---|---|---|---|---|
| | | | | | | | 14 | 15 | 16 | 17 | Example 1 |
| Composition (parts) | | | | | | | | | | | |
| SBS | 100 | 100 | 100 | 100 | 100 | * | 100 | 100 | 100 | 100 | ** |
| Benzylated phenol EOA | 10 | — | — | — | — | | — | — | — | — | |
| Styrenated phenol EOA | — | 10 | 10 | — | — | | — | — | — | — | |
| Polyalkylene polyamine EOA | — | — | — | 10 | — | | — | — | — | — | |
| Polyvalent alcohol fatty acid ester EOA | — | — | — | — | 10 | | — | — | — | — | |
| Nonyl phenol EOA Na sulfate | — | — | — | — | — | | 5 | — | — | — | |
| Nonyl phenol EOA Na phosphate | — | — | — | — | — | | — | 5 | 5 | — | |
| Nonyl phenol EOA | — | — | — | — | — | | — | — | — | 10 | |
| CMC | — | — | 0.7 | — | — | | — | — | 0.7 | — | |
| Results | | | | | | | | | | | |
| Foaming (ml) | | | | | | | | | | | |
| just after preparation | 23 | 21 | 22 | 21 | 22 | 22 | 36 | 36 | — | 23 | — |
| after 1 minute | 13 | 12 | 14 | 14 | 15 | 15 | 36 | 36 | — | 6 | — |
| after 5 minutes | 6 | 3 | 4 | 5 | 6 | 5 | 18 | 19 | — | 9 | — |
| Viscosity (mPa·s) | 185 | 190 | 1800 | 185 | 195 | 195 | 180 | 192 | — | 200 | — |
| Particle diameter (μm) | 1.8 | 1.8 | 1.9 | 1.8 | 1.9 | 1.9 | 1.6 | 1.9 | — | 2.0 | — |

TABLE 7-continued

| Example No. | 36 | 37 | 38 | 39 | 40 | 41 | Comparative Example 14 | 15 | 16 | 17 | Reference Example 1 |
|---|---|---|---|---|---|---|---|---|---|---|---|
| Storage stability | | | | | | | | | | | |
| Total solid content before centrifugation (%) | 50.0 | 50.0 | 50.0 | 50.0 | 50.0 | 50.0 | 50.0 | 50.0 | 50.0 | 50.0 | — |
| Total solid content after centrifugation (%) | 48.3 | 48.1 | 48.5 | 48.0 | 48.0 | 48.2 | 23.5 | 48.2 | 48.3 | 48.2 | — |
| Asphalt properties | | | | | | | | | | | |
| just after preparation | | | | | | | | | | | |
| 60° C. Viscosity (× $10^4$ Pa · s) | 8.0 | 8.2 | 7.9 | 8.0 | 7.8 | 7.6 | 8.1 | 8.0 | 7.5 | 7.0 | 0.2 |
| Softening point (° C.) | 88.5 | 87.0 | 86.0 | 86.0 | 85.5 | 85.5 | 81.0 | 82.0 | 81.0 | 80.5 | 49.5 |
| after one month storage(*1) | | | | | | | | | | | |
| 60° C. Viscosity (× $10^4$ Pa · s) | 7.2 | 7.5 | 7.0 | 7.0 | 6.8 | 7.1 | 2.4 | 7.0 | 6.7 | 6.5 | — |
| Softening point (° C.) | 83.5 | 82.5 | 81.0 | 82.5 | 80.5 | 83.0 | 64.5 | 80.5 | 76.5 | 75.0 | — |
| Pump stability | | | | | | | | | | | |
| Amount of coagulation (%) | 0.01 | 0.02 | 0.01 | 0.02 | 0.02 | 0.01 | 0.03 | 22.74 | 23.89 | 21.52 | — |

*Mixture of 80 parts of the aqueous dispersing emulsion obtained in Example 37 and 20 parts of anionic SBR latex
**Straight asphalt (Cosmo 60 to 80.)
(*1)"Asphalt properties after one month storage" are properties of the modified asphalt using the lower layer emulsion stored for one month.

The asphalt properties of straight asphalt (Cosmo 60 to 80) alone are shown as Reference Example 1 in Table 7.

Example 42

An emulsifying machine (TK Combi-Mix type, made by Tokushukika Kogyo Co., Ltd.) equipped with a disper, a mixer and an anchor was charged with 100 parts (20 kg) of SBS and 400 parts (80 kg) of toluene. The mixture was heated to 60° C. to dissolve SBS.

After the SBS was dissolved, 5 parts (1.0 kg) of benzylated phenol EOA and 5 parts (1.0 kg) of LDMEAES were introduced as an emulsifier, and 250 parts (50 kg) of hot water (60° C.) was added dropwise and uniformly for 30 minutes at an emulsifying temperature of 60° C. at a mixer peripheral speed of 12.8 m/s, at a disper peripheral speed of 9.6 m/s and an anchor rotation speed of 60 rpm. After addition, the mixture was stirred for 10 minutes to obtain an SBS dispersing emulsion.

Thereafter, the toluene was distilled away at 60° C. and 720 to 640 mmHg until an amount of the remaining toluene was decreased to at most 0.05%. Foaming of the obtained aqueous SBS emulsion was 21 ml just after production, 13 ml after 1 minute and 4 ml after 5 minutes.

Viscosity, particle diameter, storage stability, asphalt properties, properties of asphalt emulsion-evaporated residues, and pump stability for the resulting aqueous SBS emulsion (solid content, 50%) were measured. The results are shown in Table 8.

Example 43

An SBS dispersing emulsion was obtained and evaluated in the same manner as in Example 42 except that 5 parts of styrenated phenol EOA were used in place of 5 parts of the benzylated phenol EOA used in Example 42. The results are shown in Table 8.

Examples 44 to 48 and Comparative Examples 18 to 20

The starting materials shown in Table 8 were used in amounts shown in Table 8 to prepare and evaluate an aqueous SBS emulsion in the same manner as in Example 44. The results are shown in Table 8.

In Examples 44 to 48 and Comparative Example 20, 0.7 part (140 g) of CMC (carboxymethyl cellulose Na salt) in the form of powder as a thickener, e.g. in Comparative Example 20, was added to the aqueous SBS emulsion (solid content: 55%) obtained in Example 42 or 43 or Comparative Example 19. Then water was added thereto in an amount that the solid content became 50%, and the mixture was stirred (2000 rpm) and left for 12 hours to dissolve the CMC, whereby the dispersing emulsion was obtained. In Examples 44 to 48, a thickener shown in Table 8 was used in an amount shown in Table 8, and the same procedure was conducted.

Example 49

A product was prepared by mixing 80 parts of the aqueous SBS dispersing emulsion having a solid content of 50% obtained in Example 43 with 20 parts of a cationic SBR latex having a solid content of 50% (ROADEX K, available from JSR Corporation) to evaluate properties. The results are shown in Table 8.

In Table 8, the asphalt properties of straight asphalt (Cosmo 60 to 80) alone are shown as Reference Example 1 and the physical properties of the commercial asphalt emulsion (PK-4) as Reference Example 2.

TABLE 8

| Example No. | 42 | 43 | 44 | 45 | 46 | 47 | 48 | 49 | Comparative Example 18 | Comparative Example 19 | Comparative Example 20 | Reference Example 1 | Reference Example 2 |
|---|---|---|---|---|---|---|---|---|---|---|---|---|---|
| Composition (parts) | | | | | | | | | | | | | |
| SBS | 100 | 100 | 100 | 100 | 100 | 100 | 100 | * | 100 | 100 | 100 | ** | *** |
| Benzylated phenol EOA | 5 | — | — | — | 5 | — | — | | — | — | — | | |
| Styrenated phenol EOA | — | 5 | 5 | 5 | — | 5 | 5 | | — | — | — | | |
| LDMEAES | 5 | 5 | 5 | 5 | 5 | 5 | 5 | | — | — | — | | |
| Nonyl phenol EOA Na sulfate | — | — | — | — | — | — | — | | 5 | — | — | | |
| Nonyl phenol EOA Na phosphate | — | — | — | — | — | — | — | | — | 5 | 5 | | |
| Hydroxy propyl methyl cellulose | — | — | 0.5 | — | 0.5 | — | — | | — | — | — | | |
| Hydroxy ethyl methyl cellulose | — | — | — | 0.5 | — | — | — | | — | — | — | | |
| Dimethyl amino ethyl methacrylate.methyl chloride quaternary salt polymer | — | — | — | — | — | 1.6 | — | | — | — | — | | |
| Diallyl dimethyl ammonium chloride polymer | — | — | — | — | — | — | 1.6 | | — | — | — | | |
| CMC | — | — | — | — | — | — | — | | — | — | 0.7 | | |
| Results | | | | | | | | | | | | | |
| Foaming (ml) | | | | | | | | | | | | | |
| just after preparation | 21 | 21 | 23 | 22 | 22 | 23 | 23 | 22 | 36 | 36 | — | — | — |
| after 1 minute | 13 | 16 | 15 | 14 | 13 | 14 | 15 | 16 | — | — | — | — | — |
| after 5 minutes | 4 | 5 | 5 | 4 | 4 | 6 | 6 | 5 | 18 | 19 | — | — | — |
| Viscosity (mPa · s) | 200 | 200 | 2,200 | 2,300 | 2,300 | 2,000 | 2,100 | 1,000 | 180 | 190 | — | — | — |
| Particle diameter (μm) | 1.8 | 1.9 | 2.0 | 1.9 | 1.8 | 1.9 | 1.8 | 1.8 | 1.6 | 1.9 | — | — | — |
| Storage stability | | | | | | | | | | | | | |
| Total solid content before centrifugation (%) | 50.0 | 50.0 | 50.0 | 50.0 | 50.0 | 50.0 | 50.0 | 50.0 | 50.0 | 50.0 | 50.0 | — | — |
| Total solid content after centrifugation (%) | 48.1 | 48.0 | 49.8 | 49.5 | 49.8 | 49.6 | 49.8 | 49.5 | 21.3 | 48.3 | 48.1 | — | — |
| Asphalt properties | | | | | | | | | | | | | |
| just after preparation | | | | | | | | | | | | | |
| 60° C. Viscosity (× $10^4$ Pa · s) | 8.0 | 8.1 | 9.0 | 8.6 | 8.4 | 8.7 | 8.4 | 8.1 | 8.1 | 8.3 | 7.6 | 0.2 | — |
| Softening point (° C.) | 83.5 | 83.0 | 90.5 | 87.0 | 87.5 | 89.0 | 86.5 | 84.0 | 82.0 | 85.5 | 78.5 | 49.5 | — |
| after one month storage(*1) | | | | | | | | | | | | | |
| 60° C. Viscosity (× $10^4$ Pa · s) | 8.6 | 8.9 | 8.9 | 8.6 | 8.3 | 8.8 | 8.1 | 8.0 | 1.9 | 7.9 | 7.3 | — | — |
| Softening point (° C.) | 88.5 | 88.0 | 90.0 | 87.5 | 87.0 | 88.0 | 85.0 | 83.5 | 64.5 | 80.5 | 75.0 | — | — |
| Physical properties of asphalt emulsion evaporated residues | | | | | | | | | | | | | |
| Penetration (1/10 mm) | 96 | 95 | 94 | 96 | 95 | 94 | 96 | 94 | — | — | — | — | 128 |
| Softening point (° C.) | 81.0 | 80.5 | 81.5 | 82.0 | 80.0 | 79.5 | 80.5 | 78.5 | — | — | — | — | 42.0 |
| Elongation (5° C., cm) | 81 | 80 | 85 | 80 | 81 | 83 | 82 | 84 | — | — | — | — | 8 |
| Toughness (25° C., N · m) | 25.2 | 23.3 | 27.6 | 24.5 | 23.5 | 24.9 | 24.4 | 23.0 | — | — | — | — | 1.3 |
| Tenacity (25° C., N · m) | 20.4 | 19.5 | 22.1 | 21.36 | 20.4 | 21.8 | 21.6 | 20.1 | — | — | — | — | 0.4 |
| Pump stability | | | | | | | | | | | | | |
| Amount of coagulation (%) | 0.00 | 0.01 | 0.00 | 0.01 | 0.02 | 0.03 | 0.01 | 0.01 | 0.04 | 23.45 | 24.91 | — | — |

*Mixture of 80 parts of the aqueous dispersing emulsion obtained in Example 43 and 20 parts of cationic SBR latex
**Straight asphalt (Cosmo 60 to 80.)
***Commercial asphalt emulsion (PK-4)
(*1)"Asphalt properties after one month storage" are properties of the modified asphalt using the lower layer emulsion stored for one month.

Example 50

An emulsifying machine (TK Combi-Mix type, made by Tokushukika Kogyo Co., Ltd.) equipped with a disper, a mixer and an anchor was charged with 100 parts (20 kg) of SBS and 400 parts (80 kg) of toluene. And the mixture was heated to 60° C. to dissolve SBS.

After the SBS was dissolved, 5 parts (1.0 kg) of benzylated phenol EOA and 3 parts (0.6 kg) of rosin soap were introduced as an emulsifier, and 250 parts (50 kg) of hot water (60° C.) was added dropwise and uniformly for 30 minutes at an emulsifying temperature of 60° C. at a mixer peripheral speed of 12.8 m/s, at a disper peripheral speed of 9.6 m/s and an anchor rotation speed of 60 rpm. After addition, the mixture was stirred for 10 minutes to obtain an SBS dispersing emulsion.

Thereafter, toluene was distilled away at 60° C. and 720 to 640 mmHg until an amount of the remaining toluene was decreased to at most 0.05%. Foaming of the obtained aqueous SBS emulsion was 25 ml just after production, 15 ml after 1 minute and 6 ml after 5 minutes.

Particle diameter, viscosity, storage stability, asphalt properties and pump stability of the obtained aqueous SBS emulsion (solid content, 50%) were measured. The results are shown in Table 9.

Examples 51 to 52 and Comparative Examples 21 to 23

The starting materials shown in Table 9 were used in amounts shown in Table 9 to prepare and evaluate an aqueous SBS emulsion in the same manner as in Example 50. The results are shown in Table 9.

In Example 52 and Comparative Example 23, 0.7 part (140 g) of CMC (carboxymethyl cellulose Na salt) in the form of powder was added to the aqueous SBS emulsion (solid content: 55%) obtained in Example 50 and Comparative Example 22. Then water was added thereto in an amount that the solid content became 50%, and the mixture was stirred (2000 rpm) and left for 12 hours to dissolve the CMC, whereby the dispersing emulsion was prepared.

Example 53

A product was prepared by mixing 80 parts of the aqueous SBS dispersing emulsion having a solid content of 50% obtained in Example 51 with 20 parts of an SBR latex having a solid content of 50% (JSR0678, available from JSR Corporation) to measure asphalt properties thereof. The results are shown in Table 9.

The asphalt properties of the straight asphalt alone (Cosmo 60 to 80) used in this example are shown as Reference Example 1 in Table 9.

Example 54

An emulsifying machine (TK Combi-Mix type, made by Tokushukika Kogyo Co., Ltd.) equipped with a disper, a mixer and an anchor was charged with 100 parts (20 kg) of SBS and 400 parts (80 kg) of toluene. The mixture was heated to 60° C. to dissolve SBS.

After SBS was dissolved, 5 parts (1.0 kg) of benzylated phenol EOA and 3 parts (0.6 kg) of rosin soap were introduced as an emulsifier, and 250 parts (50 kg) of hot water (60° C.) was added dropwise and uniformly for 30 minutes at an emulsifying temperature of 60° C. at a mixer peripheral speed of 12.8 m/s, at a disper peripheral speed of 9.6 m/s and an anchor rotation speed of 60 rpm. After water was added, the mixture was stirred for 10 minutes to obtain an SBS dispersing emulsion.

Thereafter, toluene was distilled away at 60° C. and 720 to 640 mmHg until an amount of the remaining toluene was decreased to at most 0.05%. Foaming of the obtained aqueous SBS emulsion was 25 ml just after production, 15 ml after 1 minute and 6 ml after 5 minutes.

To an aqueous SBS emulsion (solid content, 55%) was added 0.3 part (60 g) of xanthan gum in the form of powder.

TABLE 9

| Example No. | 50 | 51 | 52 | 53 | Comparative Example 21 | 22 | 23 | Reference Example 1 |
|---|---|---|---|---|---|---|---|---|
| Composition (parts) | | | | | | | | |
| SBS | 100 | 100 | 100 | * | 100 | 100 | 100 | ** |
| Benzylated phenol EOA | 5 | — | 5 | | — | — | — | |
| Styrenated phenol EOA | — | 5 | — | | — | — | — | |
| Rosin soap | 3 | 3 | 3 | | — | — | — | |
| Nonyl phenol EOA Na sulfate | — | — | — | | 5 | — | — | |
| Nonyl phenol EOA Na phosphate | — | — | — | | — | 5 | 5 | |
| CMC | — | — | 0.7 | | — | — | 0.7 | |
| Results | | | | | | | | |
| Foaming (ml) | | | | | | | | |
| just after preparation | 25 | 22 | — | — | 36 | 36 | — | — |
| after 1 minute | 15 | 13 | — | — | 36 | 36 | — | — |
| after 5 minutes | 6 | 3 | — | — | 18 | 19 | — | — |
| Viscosity (mPa · s) | 182 | 175 | — | — | 180 | 192 | — | — |
| Particle diameter ($\mu$m) | 2.0 | 1.8 | — | — | 1.6 | 1.9 | — | — |
| Storage stability | | | | | | | | |
| Total solid content before centrifugation (%) | 50.0 | 50.0 | 50.0 | 50.0 | 50.0 | 50.0 | 50.0 | — |
| Total solid content after centrifugation (%) | 48.5 | 48.4 | 48.8 | 48.5 | 20.3 | 48.1 | 48.4 | — |
| Asphalt properties | | | | | | | | |
| (1) just after preparation | | | | | | | | |
| 60° C. Viscosity (× $10^4$ Pa · s) | 8.6 | 8.8 | 8.1 | 8.7 | 8.0 | 8.2 | 7.4 | 0.2 |
| Softening point (° C.) | 90 | 89 | 85 | 87 | 82 | 84 | 78 | 49.5 |
| (2) after one month storage(*1) | | | | | | | | |
| 60° C. Viscosity (× $10^4$ Pa · s) | 8.0 | 8.1 | 7.8 | 8.2 | 1.8 | 78 | 7.0 | — |
| Softening point (° C.) | 86 | 84 | 81 | 84 | 63 | 80 | 74 | — |
| Pump stability | | | | | | | | |
| Amount of coagulation (%) | 0.00 | 0.01 | 0.01 | 0.01 | 0.03 | 24.67 | 25.12 | — |

*Mixture of 80 parts of the aqueous dispersing emulsion obtained in Example 51 and 20 parts of SBR latex
**Straight asphalt (Cosmo 60 to 80)
(*1)"Asphalt properties after one month storage" are properties of the modified asphalt using the lower layer emulsion stored for one month.

Water was added in an amount that the solid content became 50%, and the mixture was stirred (2000 rpm). Thereafter, the mixture was left for 12 hours to dissolve the xanthan gum.

Particle diameter of the obtained aqueous dispersing emulsion, viscosity thereof before and after the xanthan gum addition, storage stability thereof and asphalt properties therefor were measured.

The results are shown in Table 10.

Examples 55 to 62 and Comparative Examples 24

The starting materials shown in Table 10 were used in amounts shown in Table 10 to prepare and evaluate an aqueous emulsion in the same manner as in Example 54. The results are shown in Table 10.

Example 63

A product was prepared by mixing 80 parts of the aqueous SBS dispersing emulsion having a solid content of 50% obtained in Example 55 with 20 parts of the SBR latex having a solid content of 50% (JSR0678, available from JSR Corporation) to measure asphalt properties thereof. The results are shown in Table 10.

The asphalt properties of the straight asphalt alone (Cosmo 60 to 80) used in this Example are shown as Reference Example 1 in Table 10.

TABLE 10

| Example No. | 54 | 55 | 56 | 57 | 58 | 59 | 60 | 61 | 62 | 63 | Com. Ex. 24 | Ref. Ex. 1 |
|---|---|---|---|---|---|---|---|---|---|---|---|---|
| Composition (parts) | | | | | | | | | | | | |
| SBS | 100 | 100 | 100 | 100 | 100 | 100 | 100 | 100 | 100 | | 100 | — |
| Xanthane gum | 0.3 | 0.3 | 0.3 | 0.3 | 0.3 | — | 0.2 | 0.2 | 0.2 | | — | — |
| Ramzan gum | — | — | — | — | — | 0.2 | — | — | 0.1 | | — | — |
| CMC | — | — | — | — | — | — | 0.2 | — | — | * | — | ** |
| Bentonite | — | — | — | — | — | — | — | 0.3 | — | | — | |
| Benzylated phenol EOA | 5 | — | — | — | — | — | — | — | — | | — | |
| Styrenated phenol EOA | — | 5 | 5 | — | — | 5 | 5 | 5 | 5 | | — | |
| Rosin soap | 3 | 3 | — | — | — | 3 | 3 | 3 | 3 | | — | |
| Nonyl phenol EOA Na sulfate | — | — | — | — | 5 | — | — | — | — | | 5 | |
| LDMEAES | — | — | 5 | 10 | — | — | — | — | — | | — | |
| Results | | | | | | | | | | | | |
| Foaming (ml) | | | | | | | | | | | | |
| just after production | 25 | 22 | 25 | 23 | 36 | 22 | 22 | 22 | 22 | — | 36 | — |
| after 1 minute | 15 | 13 | 15 | 14 | 36 | 13 | 13 | 13 | 13 | — | 36 | — |
| after 5 minutes | 6 | 3 | 7 | 3 | 18 | 3 | 3 | 3 | 3 | — | 18 | — |
| Viscosity (mPa · s) | | | | | | | | | | | | |
| without thickener | 182 | 175 | 178 | 167 | 180 | 190 | 185 | 150 | 180 | 181 | 180 | — |
| with thickener | 1124 | 1141 | 1222 | 1150 | 1100 | 1164 | 2000 | 1200 | 1520 | 1005 | — | — |
| Particle diameter (μm) | 2.0 | 1.8 | 1.6 | 1.3 | 1.6 | 1.8 | 1.9 | 2.0 | 1.8 | 1.9 | 1.6 | — |
| Storage stability | | | | | | | | | | | | |
| Total solid content before centrifugation (%) | 50.0 | 50.0 | 50.0 | 50.0 | 50.0 | 50.0 | 50.0 | 50.0 | 50.0 | 50.0 | 50.0 | — |
| Total solid content after centrifugation (%) | 50.0 | 50.0 | 50.0 | 49.9 | 49.9 | 50.0 | 49.6 | 50.0 | 50.0 | 49.8 | 25.3 | — |
| Asphalt properties | | | | | | | | | | | | |
| (1) just after preparation | | | | | | | | | | | | |
| 60° C. Viscosity (× 10⁴ Pa · s) | 8.6 | 8.8 | 9.3 | 9.5 | 8.1 | 8.4 | 8.6 | 8.6 | 8.3 | 8.7 | 8.0 | 0.2 |
| Softening point (° C.) | 90 | 89 | 91 | 90 | 84 | 89 | 88 | 87 | 88 | 87 | 82 | 49.5 |
| (2) after one month storage(*1) | | | | | | | | | | | | |
| 60° C. Viscosity (× 10⁴ Pa · s) | 8.7 | 8.8 | 9.4 | 9.6 | 8.0 | 8.3 | 8.6 | 8.6 | 8.4 | 8.3 | 1.8 | — |
| Softening point (° C.) | 90 | 90 | 91 | 89 | 85 | 88 | 87 | 88 | 87 | 88 | 63 | — |

*Mixture with 80 parts of the aqueous dispersing emulsion obtained in Example 55 and 20 parts of SBR latex
**Straight asphalt (Cosmo 60 to 80.)
(*1)"Asphalt properties after one month storage" are properties of the modified asphalt using the lower layer emulsion stored for one month.

INDUSTRIAL APPLICABILITY

The dispersing emulsion of the present invention is excellent in storage stability and mechanical stability. Further, the aqueous dispersing emulsion can be produced efficiently by the process of the present invention. In addition, the asphalt modifier of the present invention comprising the dispersing emulsion can be easily mixed and dissolved in asphalt to improve softening point, viscoelasticity, toughness and high-temperature viscosity of the asphalt. Therefore, it can improve the rutting resistance, abrasion resistance and toughness of pavements and give the long life of the pavements. And the modification of asphalt emulsions, which is difficult by using a conventional solid thermoplastic elastomer, can be easily conducted by using the emulsion of the present invention. Therefore, it is effective for modification of ordinary-temperature paving mixtures and coating materials. Further, because it improves low-temperature flexibility of hot asphalt, it is also effective for modification of waterproof materials.

What is claimed is:

1. An dispersing emulsion of a thermoplastic elastomer, which is emulsified and dispersed in the presence of at least one nonionic emulsifier selected from the group consisting of a styrenated phenol poly(alkylene oxide) and a benzylated phenol poly(alkylene oxide).

2. The aqueous dispersing emulsion of claim 1, wherein the nonionic emulsifier is a styrenated phenol poly(alkylene oxide).

3. The aqueous dispersing emulsion of claim 2, wherein the styrenated phenol poly(alkylene oxide) comprises a monostyrenated phenol poly(alkylene oxide): a distyrenated phenol poly(alkylene oxide): a tri- or more styrenated phenol poly(alkylene oxide)=10 to 20:40 to 55:30 to 45 (weight ratio), and the total amount is 100.

4. The aqueous dispersing emulsion of claim 1, wherein the nonionic emulsifier is a benzylated phenol poly(alkylene oxide).

5. The aqueous dispersing emulsion of claim 4, wherein the benzylated phenol poly(alkylene oxide) comprises a monobenzylated phenol poly(alkylene oxide): a dibenzylated phenol poly(alkylene oxide): a tri- or more benzylated phenol poly(alkylene oxide)=10 to 20:40 to 55:30 to 45 (weight ratio), and the total amount is 100.

6. The aqueous dispersing emulsion of claim 1, further comprising at least one selected from the group consisting of a nonionic emulsifier other than the above-mentioned nonionic emulsifier, an anionic emulsifier and a cationic emulsifier.

7. The aqueous dispersing emulsion of claim 1, further comprising a thickener.

8. The aqueous dispersing emulsion of claim 7, wherein the thickener is at least one selected from the group consisting of xanthan gum and rumzan gum.

9. A process for preparing an aqueous dispersing emulsion, which comprises preparing a solution containing at least one nonionic emulsifier selected from the group consisting of a styrenated phenol poly(alkylene oxide), a poly(alkylene polyamine) poly(alkylene oxide), polyalcohol fatty acid esters, polyalcohol fatty acid esters poly(alkylene oxide) and a benzylated phenol poly(alkylene oxide) dissolved in a solution comprising a thermoplastic elastomer and an organic solvent, then emulsifying the solution by mixing with water, and distilling the organic solvent.

10. The process for preparing an aqueous dispersing emulsion of claim 9, which comprises dissolving at least one selected from the group consisting of a nonionic emulsifier other than the above-mentioned nonionic emulsifier, an anionic emulsifier and a cationic emulsifier in the solution at the step of preparing the solution containing the nonionic emulsifier dissolved in the organic solvent, and then emulsifying the solution by mixing with water.

11. The process for preparing an aqueous dispersing emulsion of claim 10, wherein a thickener is further added and dissolved after removing the organic solvent.

12. An asphalt modifier comprising the aqueous dispersing emulsion of claim 1.

13. The aqueous dispersing emulsion of claim 6, further comprising a thickener.

14. The aqueous dispersing emulsion of claim 13, wherein the thickener is at least one selected from the group consisting of xanthan gum and rumzan gum.

15. The process for preparing an aqueous dispersing emulsion of claim 11, wherein the thickener is at least one selected from the group consisting of xanthan gum and rumzan gum.

* * * * *